US010319254B2

(12) United States Patent
Mayon

(10) Patent No.: US 10,319,254 B2
(45) Date of Patent: Jun. 11, 2019

(54) GRAPHICAL USER INTERFACES FOR SPANISH LANGUAGE TEACHING

(71) Applicant: Joel Lane Mayon, Rowlett, TX (US)

(72) Inventor: Joel Lane Mayon, Rowlett, TX (US)

( * ) Notice: Subject to any disclaimer, the term of this patent is extended or adjusted under 35 U.S.C. 154(b) by 128 days.

(21) Appl. No.: 15/183,709

(22) Filed: Jun. 15, 2016

(65) Prior Publication Data
US 2016/0293046 A1    Oct. 6, 2016

Related U.S. Application Data

(63) Continuation-in-part of application No. 14/214,469, filed on Mar. 14, 2014, now abandoned.

(60) Provisional application No. 62/175,882, filed on Jun. 15, 2015, provisional application No. 61/789,820, filed on Mar. 15, 2013.

(51) Int. Cl.
*G09B 19/06* (2006.01)
*G06F 3/0488* (2013.01)
*G06F 3/0484* (2013.01)
*G09B 5/02* (2006.01)
*G09B 7/06* (2006.01)

(52) U.S. Cl.
CPC ........... *G09B 19/06* (2013.01); *G06F 3/0488* (2013.01); *G06F 3/04842* (2013.01); *G09B 5/02* (2013.01); *G09B 7/06* (2013.01)

(58) Field of Classification Search
CPC ...... G09B 19/04; G09B 19/06; G09B 19/065; G09B 21/006; G06F 17/273; G06F 17/274; G06F 17/3456
See application file for complete search history.

(56) References Cited

U.S. PATENT DOCUMENTS

| | | | | |
|---|---|---|---|---|
| 5,229,936 A | * | 7/1993 | Decker | ............... G06F 17/2795 704/10 |
| 7,292,980 B1 | * | 11/2007 | August | ................... G10L 13/00 704/254 |
| 8,775,184 B2 | * | 7/2014 | Deshmukh | ............ G09B 19/04 434/185 |
| 9,053,089 B2 | * | 6/2015 | Bellegarda | ............ G06F 17/277 |
| 2006/0166172 A1 | * | 7/2006 | May | ...................... G09B 19/04 434/185 |
| 2007/0005364 A1 | * | 1/2007 | DeBow | ................... G10L 13/08 704/260 |
| 2007/0260461 A1 | * | 11/2007 | Marple | .................... G09B 5/04 704/260 |

(Continued)

*Primary Examiner* — Robert J Utama
(74) *Attorney, Agent, or Firm* — Fish & Richardson P.C.

(57) ABSTRACT

In one implementation, a computer-implemented method for providing a graphical user interface (GUI) that teaches correct placement of accent marks on Spanish language words through a particular sequence of graphical elements includes receiving, through a GUI presented by a computing device, a selection of a graphical word element corresponding to a word to test as part of a Spanish language teaching program; identifying, by the computing device, a particular word set that corresponds to the word from among a plurality of word sets; and outputting, in the GUI presented by the computing device and based on the particular word set, a first graphical prompt element for the user to identify whether the word has a particular ending characteristic that corresponds to the particular word set.

20 Claims, 58 Drawing Sheets

Word➔RawWord➔ClassifiedWord➔Structured Word➔Output

(56) References Cited

U.S. PATENT DOCUMENTS

| | | | |
|---|---|---|---|
| 2009/0048837 A1* | 2/2009 | Su | G09B 19/06 704/254 |
| 2010/0180235 A1* | 7/2010 | Griffin | G06F 3/0236 715/841 |
| 2010/0299137 A1* | 11/2010 | Abe | G09B 19/06 704/9 |
| 2016/0225285 A1* | 8/2016 | Mayon | G09B 19/06 |

* cited by examiner

Word➔RawWord➔ClassifiedWord➔Structured Word➔Output

Figure 4

| Word Set A | Word Set B | Word Set C | Word Set D |
|---|---|---|---|
| casa | hablé | universidad | dólar |
| miento | último | cambiar | béisbol |
| leo | cómetelo | sociedad | Pérez |
| oceano | nación | | fútbol |
| Mario | huérfano | | |
| viuda | pruébatelo | | |
| | poético | | |
| | cortó | | |

Figure 5

| Word Set E | Word Set F |
|---|---|
| río | ataúd |
| comía | Raúl |

Figure 6

| Word Set A | Word Set B | Word Set C | Word Set D |
| --- | --- | --- | --- |
| *Unmarked Words* | *Marked Words* | *Unmarked Words* | *Marked Words* |
| Ends in Vowel, n, or s?<br>yes | Ends in Vowel, n, or s?<br>yes | Ends in Consonant?<br>yes | Ends in Consonant?<br>yes |
| Stress on Penultimate Syllable?<br>yes | Stress on Penultimate Syllable?<br>no | Stress on Last Syllable?<br>yes | Stress on Last Syllable?<br>no |
| Yes/Yes | Yes/No | Yes/Yes | Yes/No |
| *Spotlit Syllable* is the Penultimate Syllable as a function of Word Ending | *Spotlit Syllable* is Penultimate Syllable as a function of Word Ending | *Spotlit Syllable* is the Last Syllable as a function of Word Ending | *Spotlit Syllable* is the Last Syllable as a function of Word Ending |

Figure 7

| Word Set E | Word Set F |
| --- | --- |
| *Marked Words* | *Marked Words* |
| Ends in Vowel, n, or s?<br>yes | Ends in Consonant?<br>yes |
| Word has stressed upper vowel?<br>yes | Word has stressed upper vowel?<br>yes |
| Word has hiatus on either side of stressed upper vowel?<br>yes | Word has hiatus on either side of stressed upper vowel?<br>yes |
| yes/yes/yes | yes/yes/yes |
| *Spotlit Syllable* is the *Tonic Syllable* | *Spotlit Syllable* is the *Tonic Syllable* |

Figure 18

| |
|---|
| List of words that begin with the letter "p." |
| paciente, pacifista, pagina, pais, paisaje, paisano, pajaro, palacio, palmada, pandillero, panqueques, papa, papa, papel, papeleria, para, paraiso, parodia, parrafo, parrilla, partidario, pasar, pasatiempo, pasion, pastel, patio, pavo, peine, pedido, pelicula, pedagogia, pendon, penicilina, pensamiento, peor, pequeno, perdida, perfumeria, periodico, periodista, pero, perro, peruano, perversidad, pesquero, petroleo, piano, picante, picnic, pico, pierna, piramide, pizca, platano, poeta, polemica, policia, poliester, pollo, portatil, porquerias, premiar, premio, preparacion, previo, primavera, principe, principio, productor, prometer, puas, puesto, pulsera, puro |
| Two extra words that don't begin with the letter "p." |
| ataud, Raul |

Figure 19

| |
|---|
| Words from the list in Figure 18 that are marked with a tilde when spelled correctly: |
| página, país, pájaro, papá, papelería, paraíso, párrafo, pasión, película, pedagogía, pendón, pérdida, perfumería, periódico, petróleo, pícnic, pirámide, plátano, polémica, policía, poliéster, portátil, porquerías, preparación, príncipe, púas |
| ataúd, Raúl |

Figure 20

| |
|---|
| Accentuation Rules for Spanish |
| The basic accentuation rules in Spanish deal with words that are marked with a tilde as well as for words that are not marked with a tilde. |
| For words that are marked with a tilde: |
| 1. Words that end in a vowel, "n" or "s" are marked with a tilde on the last syllable when the last syllable is the tonic syllable. |
| 2. Words that end in a consonant that is not "n" or "s" are marked with a tilde on the penultimate syllable if the penultimate syllable is the tonic syllable. |
| 3. Words that end in a vowel, "n" or "s" and words that end in a consonant whose tonic syllable is any syllable that precedes the penultimate syllable are marked with a tilde on the tonic syllable that precedes the penultimate syllable. |
| |
| For words that are not marked with a tilde: |
| 1. Words that end in a vowel, "n" or "s" are not marked with a tilde when the tonic syllable is the penultimate syllable. |
| 2. Words that end in a consonant that is not "n" or "s" are not marked with a tilde when the tonic syllable is the last syllable |

Figure 21

1) final letter of classified *word*
2) the *spotlit syllable* of classified *word* - as a function of the final letter in *classified word*
3) the *tonic syllable* of *classified word*
4) whether the *spotlit syllable* and the *tonic syllable* are the same syllable result in *unmarked words* or whether the *spotlit syllable* and the *tonic syllable* are not the same syllable result in *marked words*.
5) that the *spotlit syllable* of a *classified word* is a function of the whether the final letter of a *classified word* is a consonant excluding an "n" or an "s" or whether the final letter of a *classified word* is a vowel, an "n" or an "s".
6) the *pretonic syllable* of a *classified word* and the *pretonic syllable's* interrelationship with the *tonic syllable*
7) the *posttonic syllable* of a *classified word* and *posttonic syllable's* interrelationship with the *tonic syllable*
8) that the *spotlit syllable* of each *classified word* is either the final syllable or the penultimate syllable
9) that the *tonic syllable* of any *classified word* that ends in a consonant (except n or s) is either the *final syllable* or the *penultimate syllable.*
10) that the *tonic syllable* of any *classified word* ending in an "n," an "s" or a vowel is
one of the last four syllables of the *classified word*
11) that the *tonic syllable* can be focused upon visually and aurally
12) hiatus
13) that *salient features* exist and these *salient features'* constituent parts can be found in *classified words*
14) noticing and/or, recognizing and/or internalizing the interrlationship of any multiple of *salient features*
15) converting *input* into *implicit knowledge*
16) the nucleic (types of vocalic)content of *salient syllables*

Figure 22

| Word Set A | Word Set B | Word Set C | Word Set D |
|---|---|---|---|
| pacifista<br>paciente<br>paisaje<br>piano<br>petroleo<br>premio<br>partidiario<br>palacio<br>panqueques | pagina<br>papa<br>parrafo<br>pasion<br>pendon<br>periodico<br>prometio | pasar<br>productor<br>premiar<br>perversidad<br>papel | poliester<br>portatil<br>picnic |

Figure 23

| Word Set E | Word Set F |
|---|---|
| pais<br>papeleria<br>pedagogia<br>puas<br>porquerias<br>policia | ataúd<br>Raúl |

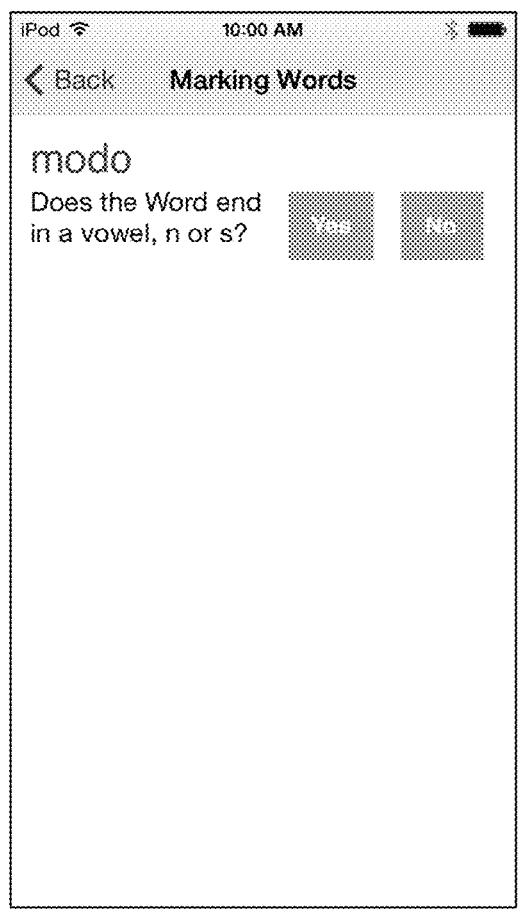
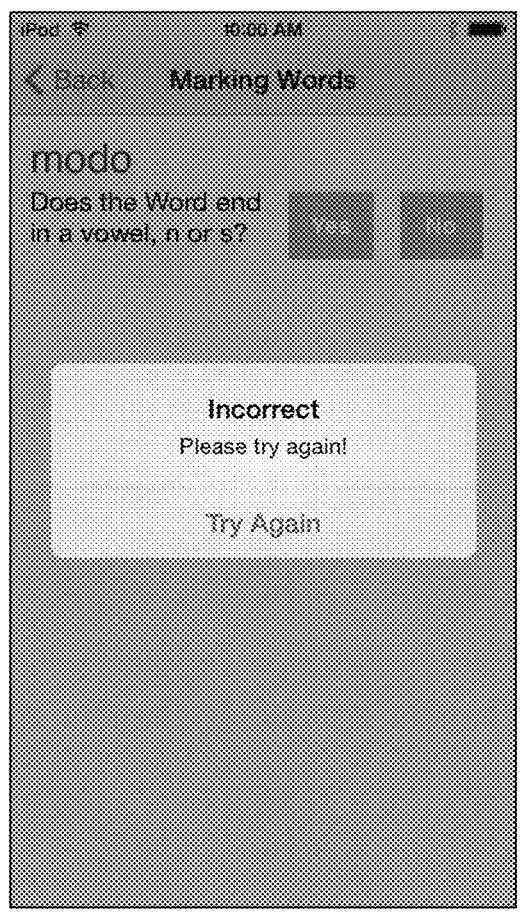
Figure 30A                              Figure 30B

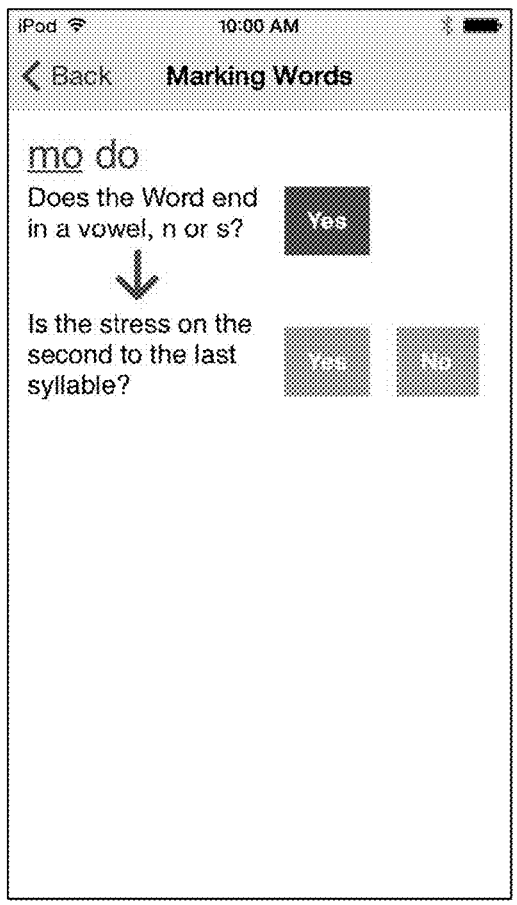 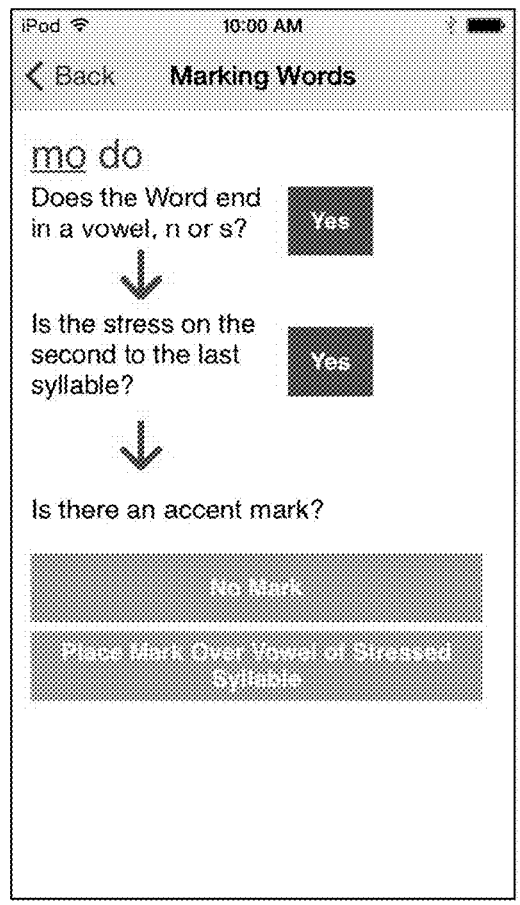
Figure 30C                              Figure 30D

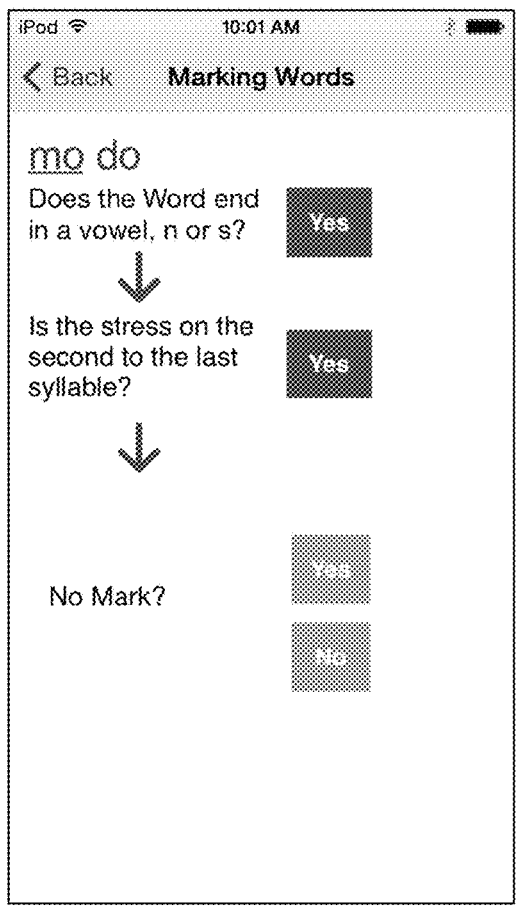
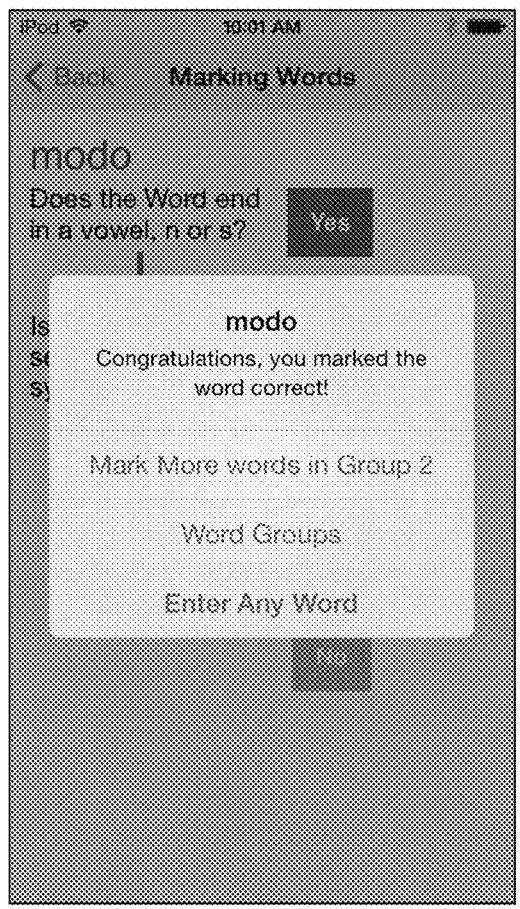
Figure 30E                                    Figure 30F

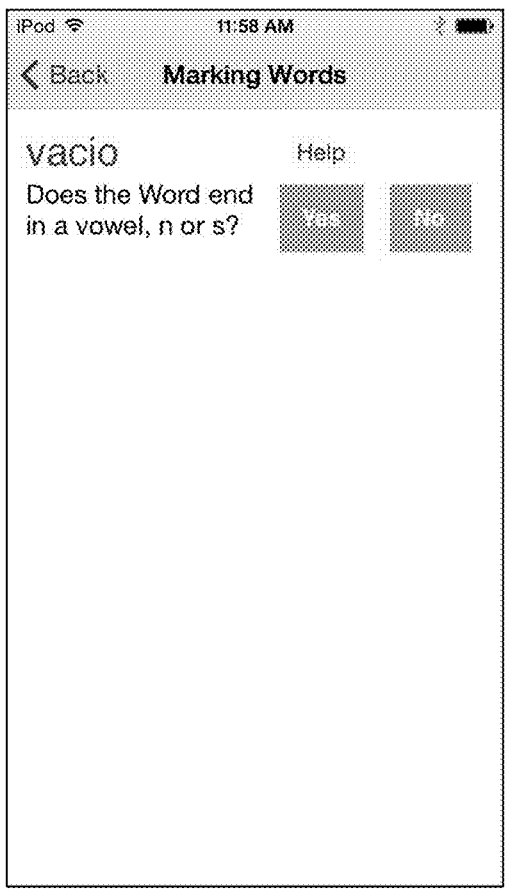
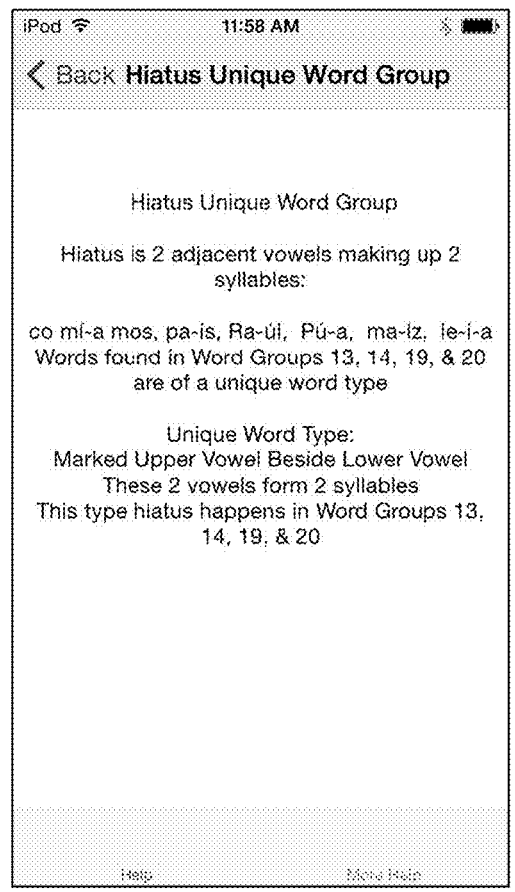
Figure 33A
Figure 33B

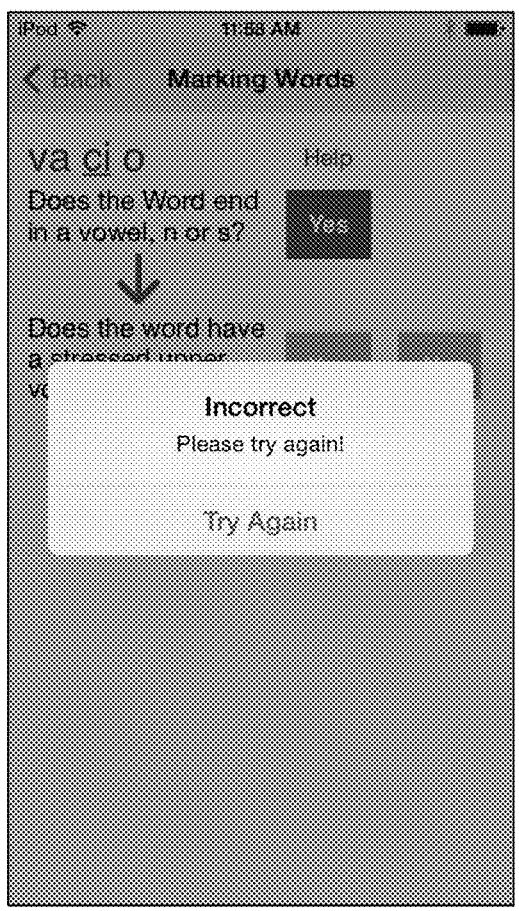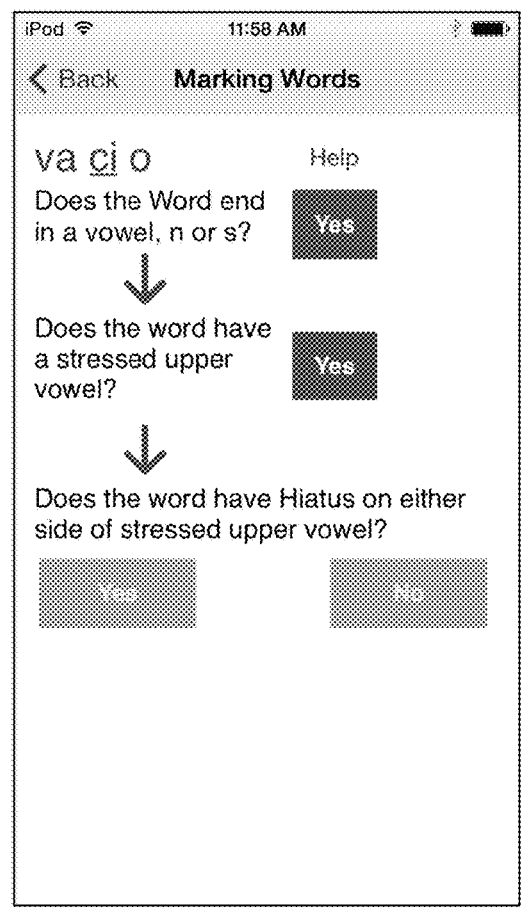
Figure 33E                    Figure 33F

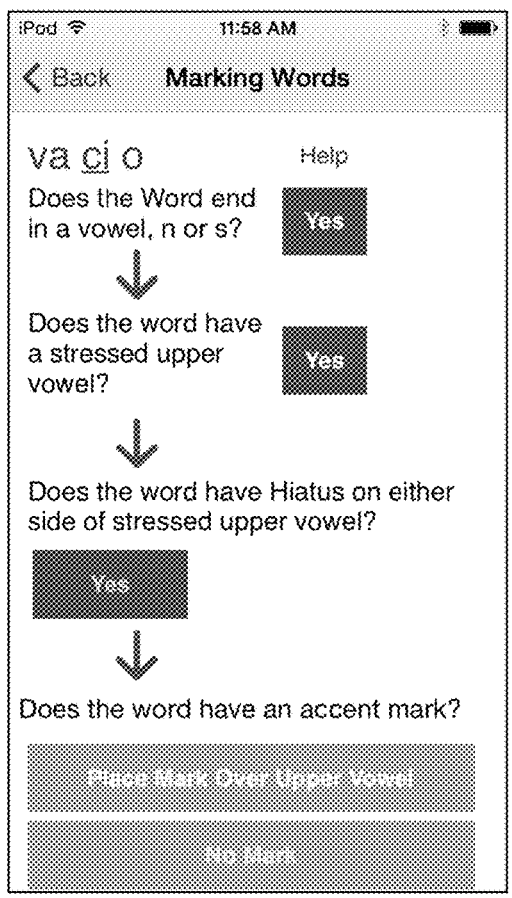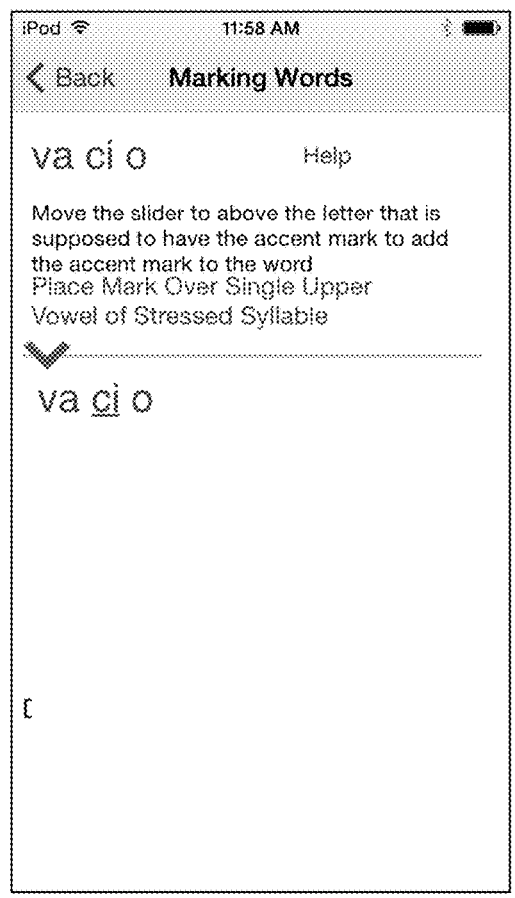
Figure 33G                    Figure 33H

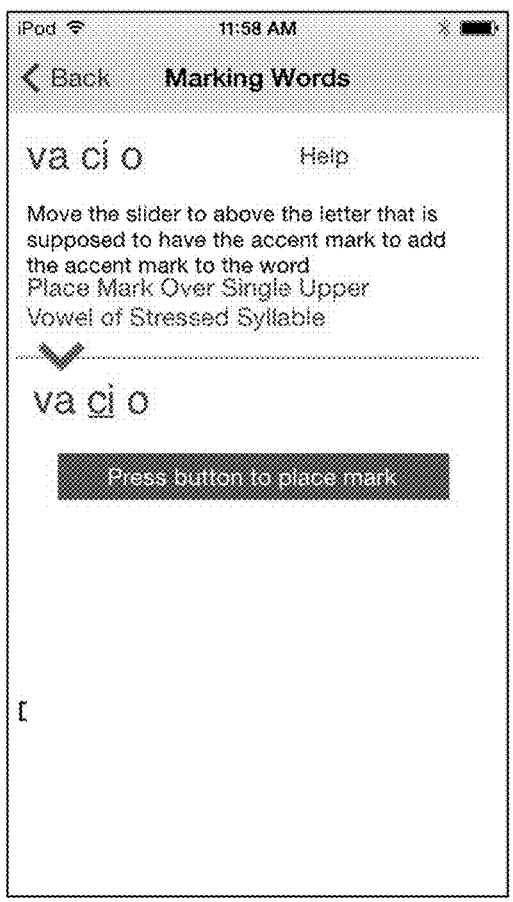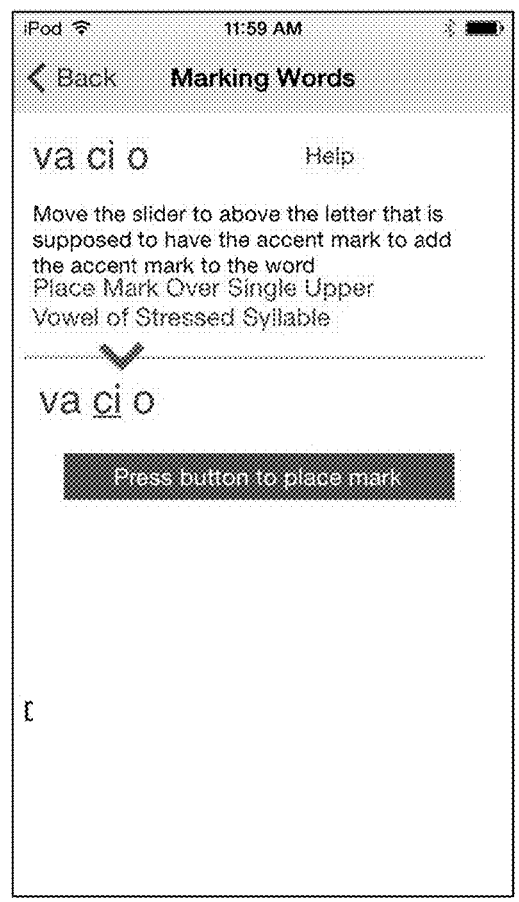
Figure 33I                    Figure 33J

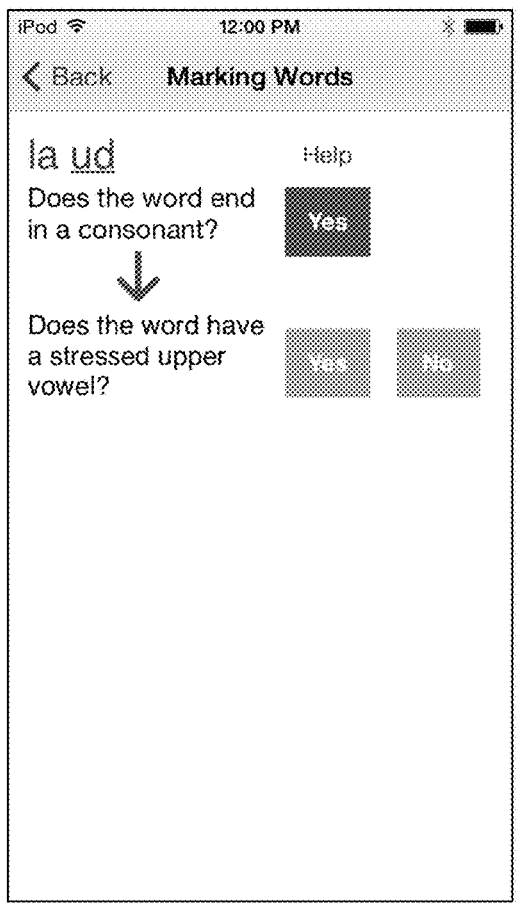
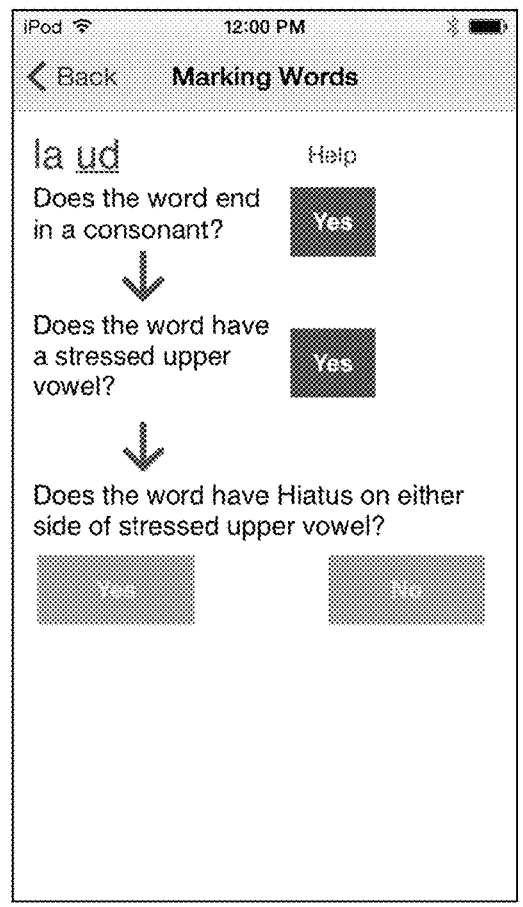
Figure 34C                    Figure 34D

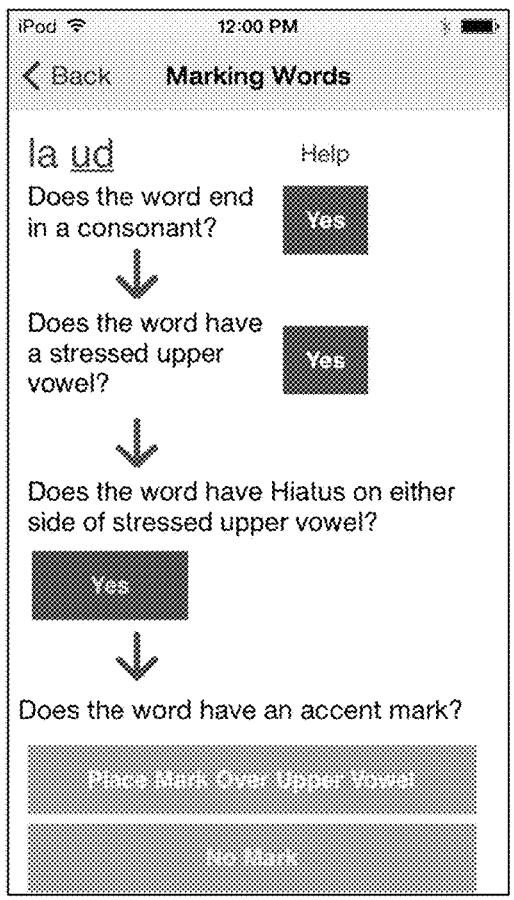 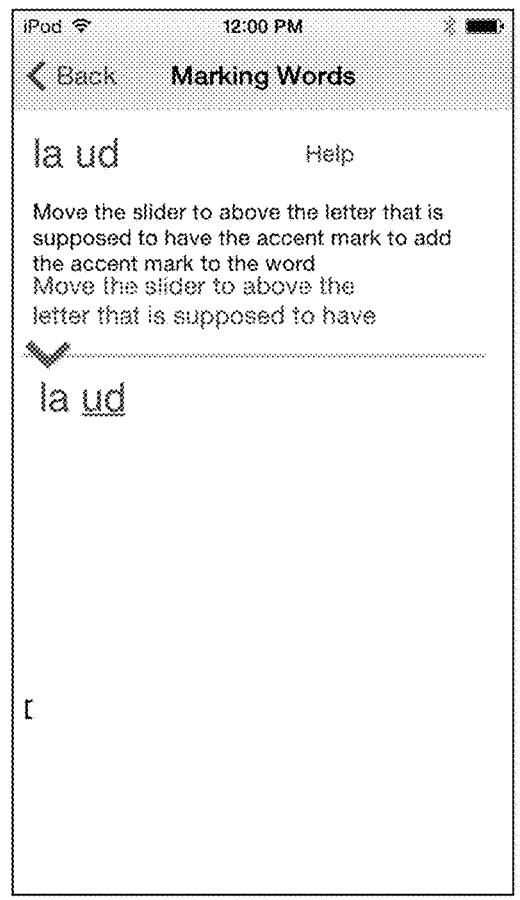
Figure 34E                    Figure 34F

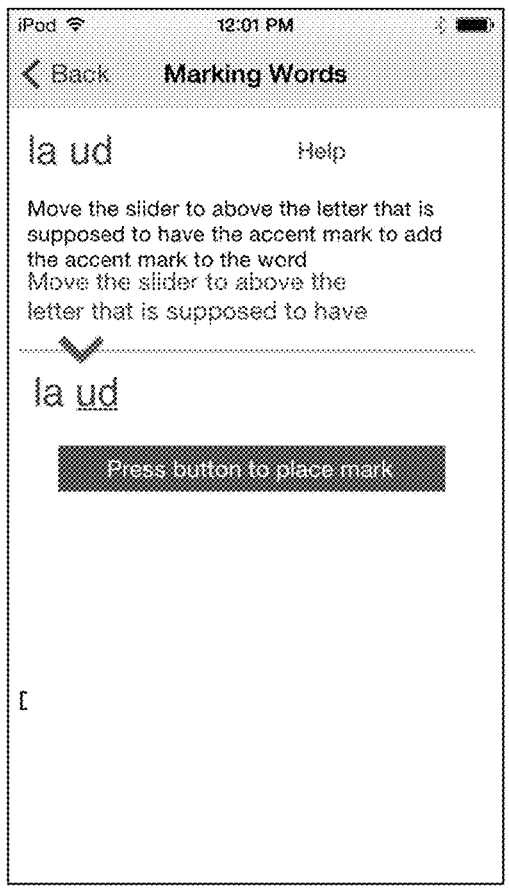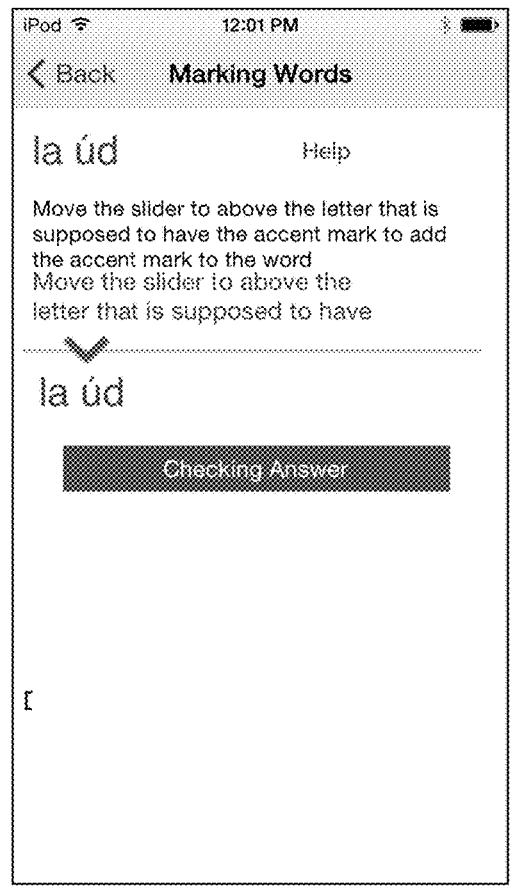
Figure 34G                     Figure 34H

Figure 35

| Word Set A | Word Set B | Word Set C | Word Set D |
|---|---|---|---|
| WT 2 casa<br>WT 8 miento<br>WT 15 leo<br>WT 16 oceano<br>WT 18 Mario<br>WT 22 viuda | WT 1 hablé<br>WT 3 último<br>WT 4 cómetelo<br>WT 7 nación<br>WT 9 huérfano<br>WT 10 pruébatelo<br>WT 14 comíamos<br>WT 17 poético<br>WT 23 jesuítico | WT 5 universidad<br>WT 11 cambiar<br>WT 21 sociedad | WT 6 dólar<br>WT 12 béisbol |

Figure 36

| Word Set E | Word Set F |
|---|---|
| WT 13 vivía<br>WT 19 leía | WT 20 ataúd |

Figure 37A

Word Set B
Word-Type 1 List of Criteria:
1) Tonic Syllable: Final Syllable
2) Word ends in: Vowel, n or s
3) Salient Features in Tonic Syllable: Single Vowel
4) Vowel/s type in Tonic Syllable: Contains Any One Vowel see examples
   Examples: hablé, se cortó, corrí
5) Word Marked

Word Set A
Word-Type 2 List of Criteria:
1) Tonic Syllable: PenUltimate
2) Word ends in: Vowel, n or s
3) Salient Features in Tonic Syllable: Single Vowel
4) Vowel/s type in Tonic Syllable: Contains Any One Vowel see examples
   Examples: imposible casa bimbo
5) Word Not Marked

Word Set B
Word-Type 3 List of Criteria:
1) Tonic Syllable: AntePenUltimate
2) Word ends in: Vowel, n or s
3) Salient Features in Tonic Syllable: Single Vowel
4) Vowel/s type in Tonic Syllable: Contains Any One Vowel see examples
   Examples: último, átomo, mínimo
5) Word Marked

Word Set B
Word-Type 4 List of Criteria:
1) Tonic Syllable: TransAntePenUltimate
2) Word ends in: Vowel, n or s
3) Salient Features in Tonic Syllable: Single Vowel
4) Vowel/s type in Tonic Syllable: Contains Any One Vowel see examples
   Examples: contestándoselo, consúltamelo, cómetelo
5) Word Marked

FIGURE 37B

Word Set C
Word-Type 5 List of Criteria:
1) Tonic Syllable: Final
2) Word ends in: Consonant
3) Salient Features in Tonic Syllable: Single Vowel
4) Vowel/s type in Tonic Syllable: Contains Any One Vowelsee examples
   Examples: universidad, profesor, comedor
5) Word Not Marked

Word Set D
Word-Type 6 List of Criteria:
1) Tonic Syllable: PenUltimate
2) Word ends in: Consonant
3) Salient Features in Tonic Syllable: Single Vowel
4) Vowel/s type in Tonic Syllable: Contains Any One Vowelsee examples
   Examples: dólar, árbol, lápiz
5) Word Marked

Word Set B
Word-Type 7 List of Criteria:
1) Tonic Syllable: Final
2) Word ends in: Vowel, n or s
3) Salient Features in Tonic Syllable: Diphthong
4) Vowel/s type in Tonic Syllable: Contains Upper and Lower see examples
   Examples: comió, nación, también
5) Word Marked

Word Set A
Word-Type 8 List of Criteria:
1) TonicSyllable: PenUltimate
2) Word ends in: Vowel, n or s
3) Salient Features in Tonic Syllable: Diphthong
4) Vowel/s type in Tonic Syllable: Contains Upper and Lower see examples
   Examples: peino, miento, suelo
5) Word Not Marked

FIGURE 37C

Word Set B
Word-Type 9 List of Criteria:
1) Tonic Syllable: AntePenUltimate
2) Word ends in: Vowel, n or s
3) Salient Features in Tonic Syllable: Diphthong. Any 2 vowels in one syllable
4) Vowel/s type in Tonic Syllable: Contains Upper and Lowersee examples
   Examples: huérfano, diáfono
5) Word Marked

Word Set B
Word-Type 10 List of Criteria:
1) Tonic Syllable: TransAntePenUltimate
2) Word ends in: Vowel, n or s
3) Salient Features in Tonic Syllable: Diphthong
4) Vowel/s type in Tonic Syllable: Contains Upper and Lowersee examples
   Examples: sirviéndoselo, péinatelo, pruébatelo, uniéndoselo, ciérramelo
5) Word Marked

Word Set C
Word-Type 11 List of Criteria:
1) Tonic Syllable: Final
2) Word ends in: Consonant
3) Salient Features in Tonic Syllable: Diphthong
4) Vowel/s type in Tonic Syllable: Contains Upper and Lower see examples
   Examples: cambiar, menospreciar
5) Word Not Marked

Word Set D
Word-Type 12 List of Criteria:
1) Tonic Syllable: PenUltimate
2) Word ends in: Consonant
3) Salient Features in Tonic Syllable: Diphthong
4) Vowel/s type in Tonic Syllable: Contains Upper and Lower see examples
   Examples: Suárez, tráiler, béisbol,
5) Word Marked

FIGURE 37D

Secondary Significant Syllable Content: Posttonic syllable
Can Consist of One Lower Vowel.
Word Set E
Word-Type 13 List of Criteria:
1) Tonic Syllable: PenUltimate
2) Word ends in: Vowel,n,s
3) Salient Features in Tonic Syllable: Stressed upper vowel with any other vowel found on either side of stressed upper vowel in tonic syllable.
4) Vowel/s type in Tonic Syllable: Contains Stressed Upper Vowel = Syllable Limit can be on both sides of tonic syllalbe. Note: This stressed upper vowel can be attatched to a consonant or consonants as per syllabification rules. Examples: río, María, comía
5) Word Marked: Hiatus

Word Set B
Word-Type 14 List of Criteria:
1) Tonic Syllable: AntePenUltimate
2) Word ends in: Vowel,n,s
3) Salient Features in Tonic Syllable: Significant Syllable consists of a single upper vowel preceded by a consonant and followed by a lower vowel in subsequent syllable = hiatus
4) Vowel/s type in Tonic Syllable: Contains Stressed Upper Vowel = Syllable Limit see examples
   Examples: comíamos, escribíamos, servíamos
5) Word Marked: Hiatus

Secondary Salient Syllable Content: Second-lower vowel of the two-lower-vowel sequence
Word Set A
Word-Type 15 List of Criteria:
1) Tonic Syllable: PenUltimate
2) Word ends in: Vowel,n,s
3) Salient Features in Tonic Syllable: First lower vowel of a two-lower-vowel sequence constituting two syllables.
4) Vowel/s type in Tonic Syllable: Contains see examples
   Examples: mercadeo , leo, cree, crea,
5) Word Not Marked

Secondary Salient Syllable Content: First-lower vowel of the two-lower-vowel sequence
Word Set A
Word-Type 16 List of Criteria:
1) Tonic Syllable: PenUltimate
2) Word ends in: vowel,n,s
3) Salient Features in Tonic Syllable: Second lower vowel of a two-lower-vowel sequence constituting two syllables.
4) Vowel/s type in Tonic Syllable: Contains see examples
   Examples: maestra, paseamos, cumpleaños
5) Word not marked

---

Secondary Salient Syllable Content: First-lower vowel of the two-lower-vowel sequence
Word Set B
Word-Type 17 List of Criteria:
1) Tonic Syllable: AntePenUltimate
2) Word ends in: vowel,n,s
3) Salient Features in Tonic Syllable: Second lower vowel of a two-lower-vowel sequence constituting two syllables.
4) Vowel/s type in Tonic Syllable: Contains see examples
   Examples: meódromo, teórico, aéreo, poético
5) Word Marked. Hiatus

---

Secondary Salient Syllable Content: Final Syllable has Unstressed Diphthong
Word Set A
Word-Type 18 List of Criteria:
1) Tonic Syllable: PenUltimate
2) Word ends in: Vowel,n,s and/or Diphthong
3) Salient Features in Tonic Syllable: Single Vowel
4) Vowel/s type in Tonic Syllable: Contains Single Vowel or Diphthong
   Examples: misterio, sugerencia, Mario, ciencia
5) Word Not Marked

FIGURE 37F

Word Set E
Word-Type 19 List of Criteria:
1) Tonic Syllable: PenUltimate
2) Word ends in: Vowel,n,s
3) Salient Features in Tonic Syllable: Stressed upper vowel with any other vowel found on either side of stressed upper vowel in tonic syllable.
Tonic Syllable consists of a single
   upper vowel.
4) Vowel/s type in Tonic Syllable: Contains see examples
   Examples: leía, caía, fluído, construído
5) Word Marked

Word Set F
Word-Type 20 List of Criteria:
1) Tonic Syllable: Final
2) Word ends in: Consonant
3) Salient Features in Tonic Syllable: Stressed upper vowel with any other vowel found on either side of stressed upper vowel in tonic syllable.
4) Vowel/s type in Tonic Syllable: Contains Any One Vowel see examples
   Examples: Raúl, país, maíz
5) Word Marked Hiatus

Secondary Salient Syllable Content: SSS Syllable has Unstressed Diphthong
Word Set C
Word-Type 21 List of Criteria:
1) Tonic Syllable: Final
2) Word ends in: Consonant
3) Salient Features in Tonic Syllable: Single Vowel
4) Vowel/s type in Tonic Syllable: Contains Upper and Lowersee examples
   Examples: Sociedad, propiedad
5) Word Not Marked

Word Set
Word-Type 22 List of Criteria:
1) Tonic Syllable: PenUltimate
2) Word ends in: Vowel,n,s
3) Salient Features in Tonic Syllable: Upper-Vowel Diphthong
4) Vowel/s type in Tonic Syllable: Contains Two Upper Vowels see examples
   Examples: diurno, viuda, incluido, fluido,
5) Word Not Marked

FIGURE 37G

| |
|---|
| Word Set |
| Word-Type 23 List of Criteria: |
| 1) Tonic Syllable: AntePenUltimate |
| 2) Word ends in: Vowel,n,s |
| 3) Salient Features in Tonic Syllable: Upper-VowelDiphthong |
| 4) Vowel/s type in Tonic Syllable: Contains Two Upper Vowels see examples   Examples: jesuítico |
| 5) Word Marked |

GRAPHICAL USER INTERFACES FOR SPANISH LANGUAGE TEACHING

CROSS-REFERENCE TO RELATED APPLICATIONS

This application is a continuation-in-part of U.S. application Ser. No. 14/214,469, filed on Mar. 14, 2014, which claims the benefit of priority under 35 U.S.C. § 119(e) to U.S. Provisional Application Ser. No. 61/789,820, which was filed on Mar. 15, 2013. This application also claims the benefit of priority under 35 U.S.C. § 119(e) to U.S. Provisional Application Ser. No. 62/175,882, which was filed on Jun. 15, 2015. The entire contents of the related applications are incorporated herein by reference.

TECHNICAL FIELD

This document generally describes graphical user interfaces (GUI) for teaching Spanish language features, such as GUIs that efficiently render graphical elements in smaller form-factor displays, such as on mobile devices (e.g., smartphones), for teaching Spanish language features (e.g., placement of accent marks).

BACKGROUND

Each word in the Spanish language is either marked with a tilde, such as in está, or is not marked with a tilde, such as in casa. Therefore in order to learn the orthographic system in Spanish, it is imperative for the learner to become proficient at distinguishing the rationale behind words that are marked with a tilde from words that are not marked with a tilde.

In order to become proficient at distinguishing the rationale behind words that are marked with a tilde from words that are not marked with a tilde, learners experience the problem of being forced to spend a long period of time and expend a large amount of effort as they attempt to figure out how to apply the rule set for tilde placement for words in Spanish. This problem has been on going as long as the rule set has existed. Because the rules have been difficult to learn to apply, learners may spend several semesters or years practicing and carrying out drills that focus on learning the accentuation system of Spanish.

SUMMARY

This document generally describes computer-based technology for providing GUIs with specifically placed and sequenced graphical elements to help learners understand differences between words with and without tildes (may also be referred to as accents or accent marks) in a manner that they will be able to predictively and correctly apply. In particular, this document describes computer-based applications (e.g., mobile applications) that can provide GUIs that output (e.g., display, audibly output) graphical elements with prompts to help users learn rules to classify words into different sets and to determine tilde placement as part of those sets. Such computer-based applications can use a variety of techniques, such as processing templates for various sets of words that can be applied to various words. Learners can benefit by avoiding the long period of time that is traditionally spent to become proficient at distinguishing the rationale behind words that are marked with tildes from words that are not marked with tildes.

Processing templates can be programmed such that the post-processed word (output) of each word can be predicted. For example, a processing template can generate a post-processed word that is correctly spelled with regard to correct tilde placement. Processing templates can be programmed to include at least one control function through which users can provide input as the users process words through the processing template. This can allow users to interact with salient features for word processing in a manner that decreases the amount of time and effort conventionally needed for a user to become proficient at distinguishing the rationale behind words that are marked with tildes from words that are not marked with tildes.

The basic accentuation rules in Spanish can be applied to words that are marked with a tilde as well as for words that are not marked with a tilde.

For words that are marked with a tilde:
1. Words that end in a vowel, "n" or "s" are marked with a tilde on the final syllable when the final syllable is the tonic syllable.
2. Words that end in a consonant that is not "n" or "s" are marked with a tilde on the penultimate syllable when the penultimate syllable is the tonic syllable.
3. Words that end in a vowel, "n" or "s" and words that end in a consonant whose tonic syllable is any syllable that precedes the penultimate syllable are marked with a tilde on the tonic syllable that precedes the penultimate syllable.

For words that are not marked with a tilde:
1. Words that end in a vowel, "n" or "s" are not marked with a tilde when the tonic syllable is the penultimate syllable.
2. Words that end in a consonant that is not "n" or "s" are not marked with a tilde when the tonic syllable is the final syllable.

Instead of using basic accentuation rules as well as practice drills intended to teach the learner to apply the rules, which learners can perceived abstractly to be simple and can have difficulty applying to individual words in a practical way, the disclosed technology can provide a heuristic and reliable procedure that develops the learner's procedural knowledge in a faster and more didactically effective manner. In particular, the disclosed technology can provide a holistic procedure that guides the learner to pragmatically and correctly apply the (accentuation) rules in a faster and more didactically effective manner. The end result can transform the typical learner into a successful learner who is able to correctly identify tilde placement on individual words with ease.

In one implementation, a computer-implemented method for providing a graphical user interface (GUI) that teaches correct placement of accent marks on Spanish language words through a particular sequence of graphical elements includes receiving, through a GUI presented by a computing device, a selection of a graphical word element corresponding to a word to test as part of a Spanish language teaching program; identifying, by the computing device, a particular word set that corresponds to the word from among a plurality of word sets; outputting, in the GUI presented by the computing device and based on the particular word set, a first graphical prompt element for the user to identify whether the word has a particular ending characteristic that corresponds to the particular word set; receiving, through the GUI presented by the computing device, first user input including selection of a first graphical response element that corresponds to one of a plurality of first responses to the first prompt that are presented in the GUI; determining, by the computing device and based on the particular word set, whether the first input correctly identifies the particular ending characteristic for the word; outputting, in the GUI presented by the computing device and based on (i) the determination of whether the first input is correct and (ii) the particular word set, a second graphical prompt element for the user to identify whether the word has a particular stressed syllable that corresponds to the particular word set; receiving, through the GUI presented by the computing device, second user input including selection of a second graphical response element that corresponds to one of a plurality of second responses to the second prompt that are presented in the GUI; determining, by the computing device and based on the particular word set, whether the second input correctly identifies the particular stressed syllable for the word; outputting, in the GUI presented by the computing device and based on (i) the determination of whether the second input is correct and (ii) the particular word set, a third graphical prompt element for the user to identify whether the word has an accent mark; receiving, through the GUI presented by the computing device, third user input including selection of a third graphical response element that corresponds to one of a plurality of third responses to the third prompt that are presented in the GUI; determining, by the computing device and based on the particular word set, whether the third input correctly identifies whether the word has an accent mark; and outputting, through the GUI presented by the computing device, a results graphical element with results that identify whether the user correctly identified an accent mark for the word through the selection of the first, second, and third graphical response elements.

In another implementation, a computing device for providing a graphical user interface (GUI) that teaches correct placement of accent marks on Spanish language words through a particular sequence of graphical elements includes one or more processors; one or more input devices and a display that are programmed to present a GUI; and one or more storage devices containing instructions that, when executed, cause the one or more processors to perform operations including receiving, through the GUI, a selection of a graphical word element corresponding to a word to test as part of a Spanish language teaching program; identifying a particular word set that corresponds to the word from among a plurality of word sets; outputting, in the GUI and based on the particular word set, a first graphical prompt element for the user to identify whether the word has a particular ending characteristic that corresponds to the particular word set; receiving, through the GUI, first user input including selection of a first graphical response element that corresponds to one of a plurality of first responses to the first prompt that are presented in the GUI; determining, based on the particular word set, whether the first input correctly identifies the particular ending characteristic for the word; outputting, in the GUI and based on (i) the determination of whether the first input is correct and (ii) the particular word set, a second graphical prompt element for the user to identify whether the word has a particular stressed syllable that corresponds to the particular word set; receiving, through the GUI, second user input including selection of a second graphical response element that corresponds to one of a plurality of second responses to the second prompt that are presented in the GUI; determining, based on the particular word set, whether the second input correctly identifies the particular stressed syllable for the word; outputting, in the GUI and based on (i) the determination of whether the second input is correct and (ii) the particular word set, a third graphical prompt element for the user to identify whether the word has an accent mark; receiving, through the GUI, third user input including selection of a third graphical response element that corresponds to one of a plurality of third responses to the third prompt that are presented in the GUI; determining, based on the particular word set, whether the third input correctly identifies whether the word has an accent mark; and outputting, through the GUI, a results graphical element with results that identify whether the user correctly identified an accent mark for the word through the selection of the first, second, and third graphical response elements.

In another implementation, a computer-implemented method for providing a graphical user interface (GUI) that teaches correct placement of accent marks on Spanish language words through a particular sequence of graphical elements, the method includes receiving, through a GUI presented by a computing device, a selection of a graphical word element corresponding to a word to test as part of a Spanish language teaching program; identifying, by the computing device, a particular word set that corresponds to the word from among a plurality of word sets; outputting, in the GUI presented by the computing device based on the particular word set, a first graphical prompt element for the user to identify whether the word has a particular ending characteristic that corresponds to the particular word set; receiving, through the GUI presented by the computing device, first user input including selection of a first graphical response element that corresponds to one of a plurality of first responses to the first prompt that are presented in the GUI; determining, by the computing device and based on the particular word set, whether the first input correctly identifies the particular ending characteristic for the word; outputting, in the GUI presented by the computing device and based on the particular word set, a second graphical prompt element for the user to identify whether the word has a particular stressed syllable that corresponds to the particular word set; receiving, through the GUI presented by the computing device, second user input including selection of a second graphical response element that corresponds to one of a plurality of second responses to the second prompt that are presented in the GUI; determining, by the computing device and based on the particular word set, whether the second input correctly identifies the particular stressed syllable for the word; outputting, in the GUI presented by the computing device and based on the particular word set, a third graphical prompt element for the user to identify whether the word has an accent mark; receiving, through the GUI presented by the computing device, third user input including selection of a third graphical response element that corresponds to one of a plurality of third responses to the third prompt that are presented in the GUI; determining, by the computing device and based on the particular word set, whether the third input correctly identifies whether the word has an accent mark; and outputting, through the GUI presented by the computing device, a results graphical element with results that identify whether the user correctly identified an accent mark for the word through the selection of the first, second, and third graphical response elements.

Various implementations can provide one or more advantages. For example, individual random words can be predictively and correctly processed as the user needs. Moreover, any random word can be categorized into its respective word category so that it can be sequentially processed with other words of the same category, which can help increase the learner's ability to become proficient at distinguishing the rationale behind words that are marked with tildes from words that are not marked with tildes. In another example, procedural knowledge required to accurately apply the accentuation rules to all words in Spanish can be quickly developed by users through interaction with the computer-based technology described in this document. Such quick development of the required procedural knowledge may not typically occur with learners who use the traditional teaching methods to apply the rule set for accentuation to random words in Spanish.

In a further example, processing templates can be used to correctly provide and display explicit combinations of essential features that generate correctly spelled words in Spanish (for any word in Spanish) with regard to correctly applying the accentuation rules for tilde placement. Such word processing templates be programmed to perform one or more algorithms that predict and generate a correctly spelled word (with regard to correctly applying the accentuation rules for tilde placement) as a discrete result. Each classified word can be processed through, for example, yes/no algorithms that are utilized in word-set processing. As the learner interacts with and processes a multiple of classified words of the same word set through, for example, the algorithms for word sets A-F, the learner figures out how to correctly process one word at a time per word set in a systematic and didactically effective manner.

In another example, the disclosed processes can also equip the learner so that, through interacting heuristically, metacognitively and synergistically with words utilizing the process, the learner notices, internalizes and quickly develops the implicit/procedural knowledge to be able to correctly apply the accentuation rules. Such processes can allow learners to successfully processing of each word in the Spanish language.

In a further example, the disclosed technology in this document can improve GUIs that are presented on client computing devices, including client computing devices with smaller form factor displays, such as mobile computing devices (e.g., smartphones, tablets, wearable devices). For example, GUIs are described that display relevant graphical elements at appropriate times in a sequence so that each graphical element is sufficiently visible to a user, is presented within an appropriate visual context so that its connection to other graphical elements can be readily understood (i.e., without the need for extraneous visual information to be presented on the screen), and so that only a subset of all graphical elements are presented at a given time so as readily to focus the user's attention on the current action item for the user's consideration.

The details of one or more embodiments are set forth in the accompanying drawings and the description below. Other features and advantages will be apparent from the description and drawings, and from the claims.

BRIEF DESCRIPTION OF THE DRAWINGS

FIG. 4 depicts example raw words for each word set A, B, C and D.

FIG. 5 depicts example raw words for each word set E and F.

FIG. 6 depicts the essential features for word-set processing for the exemplary word sets: A, B, C and D.

FIG. 7 depicts the essential features for word-set processing for the exemplary word sets D and E.

FIG. 18 depicts a random list of words that begin with the letter "p."

FIG. 19 depicts a list of words from the list in FIG. 18 that are marked with a tilde when spelled correctly.

FIG. 20 depicts the rules for accentuation (tilde placement) for words in Spanish.

FIG. 21 depicts a list of salient features of words in Spanish.

FIG. 22 depicts the list of random words seen in FIG. 18 categorized into each random word's respective word set: A, B, C or D.

FIG. 23 depicts the list of random words seen in FIG. 18 categorized into each random word's respective word set: E or F.

FIGS. 30A-F are screenshots of user interfaces that can be presented for processing an example word from word set A.

FIGS. 33A-L are screenshots of user interfaces that can be presented for processing an example word from word set E.

FIGS. 34A-I are screenshots of user interfaces that can be presented for processing an example word from word set F.

FIGS. 35, 36 and 37A-G depict example word types.

Like reference symbols in the various drawings indicate like elements.

DETAILED DESCRIPTION

Figures 1, 2:
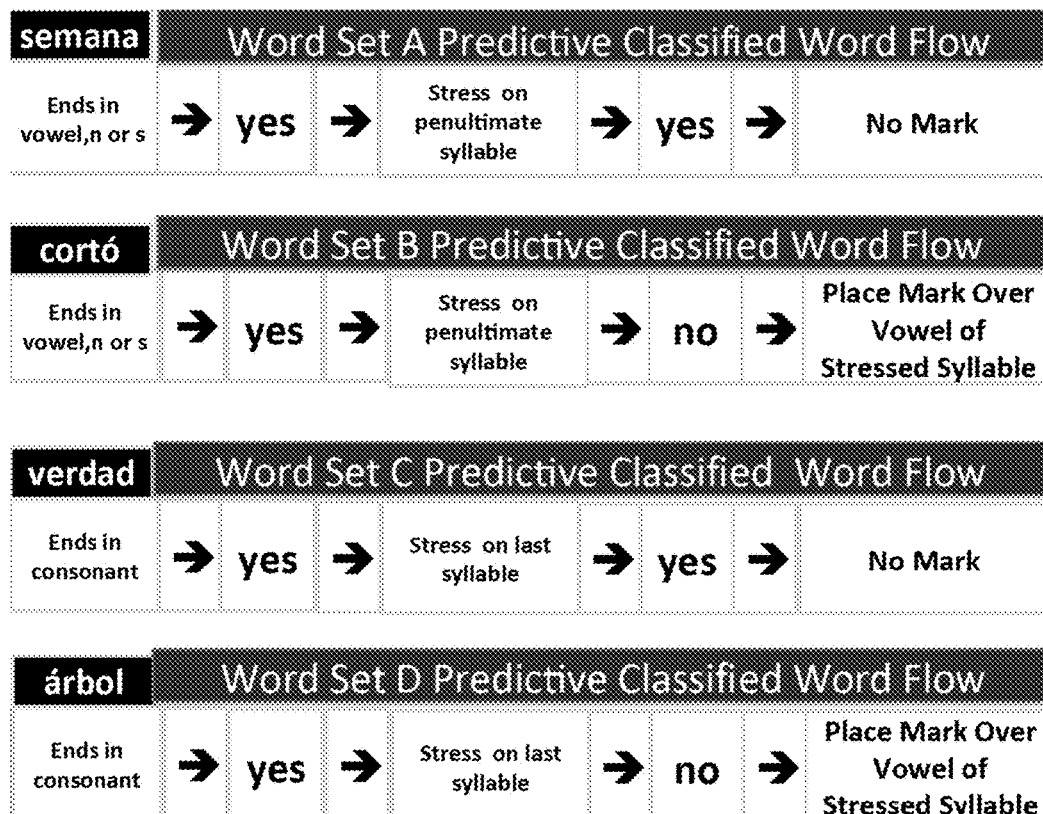
FIG. 1 depicts the conversion of word to raw word to classified word to a structured word to output.
FIG. 2 depicts predictive flow of classified words through word-set processing templates for word sets A, B, C and D.

Previous teaching methods around tilde placement did not provide the learner with substantive global procedures to facilitate the learner's development of proficiency, and the learner was left on his/her own to figure out how to become proficient at applying the abstract rule set in a pragmatic way.

For example, previous teaching methods involved learners performing the following steps:
1. apply rules to list of words
2. unsure and unclear of resultant word
3. problem integrating salient features as learner attempts to apply rule set So as the learner practiced using the extant teaching, the learner attempted to apply the extant rule set to words in Spanish, and the learner was unsure and unclear about whether the words that the learner attempts to mark (or not) are being marked correctly. This happens because the learner has no procedure that provided feedback or guidance as to the correct result. Additionally, learners did not have templates through which they could notice interrelationships of the salient features of classified words as the classified words are being processed through the template.

Example rules sets that were used with previous teaching methods are depicted in FIGS. 18-20. For example, a basic rule set is depicted in FIG. 20, which learners would then attempt to apply to a list of words, such as those seen in FIG. 18. A list of example words that can be found in a glossary of a typical beginning Spanish textbook are depicted in FIG. 18. In FIG. 18, the tilde has been removed from each word to illustrate a list of words to which learners would attempt to correctly place tilde marks. FIG. 19 depicts the example words in FIG. 18 that are marked with a tilde. Typically the learner attempts to figure out how to apply the rule set by using the rules as seen in FIG. 20 to determine (1) which words receive a tilde and, of those words receiving tildes, (2) which letter of the word receives the tilde. The words in FIG. 18 serve as exemplary words to illustrate what the learner experiences as he/she attempts to apply the rules as depicted in FIG. 20 to the exemplary words as depicted in FIG. 18.

In order to learn the system of correctly placing tildes on words in Spanish, not only is the learner required to memorize and learn the rules in an abstract manner and apply the rule set to words in Spanish, but the learner also has to learn how to integrate the rule set (FIG. 20) with a multiple of salient features (see FIG. 21) of words in Spanish. The rule set seems simple as seen abstractly.

However, when the learner attempts to apply the rules to words in Spanish, the learner encounters multiple of salient features that user is forced to contend with as he attempts to apply the rule set (as depicted in FIG. 21). So the user is generally unable to learn the system because the system lacks a complete and reliable metacognitive support structure and method that provides a holistic (global) photo of the system in its entirety and also provides a photo of the system's distinct parts as needed in real time for all words in Spanish. Therefore the learner may be unable to quickly learn to apply the rule set to words in Spanish, and he/she spends a long period of time to learn to apply the rule set. FIG. 21 depicts an exemplary list of salient features within words that the learner experiences—simultaneous to attempting to apply the rule set (FIG. 20) to any random word in Spanish.

Figure 3:
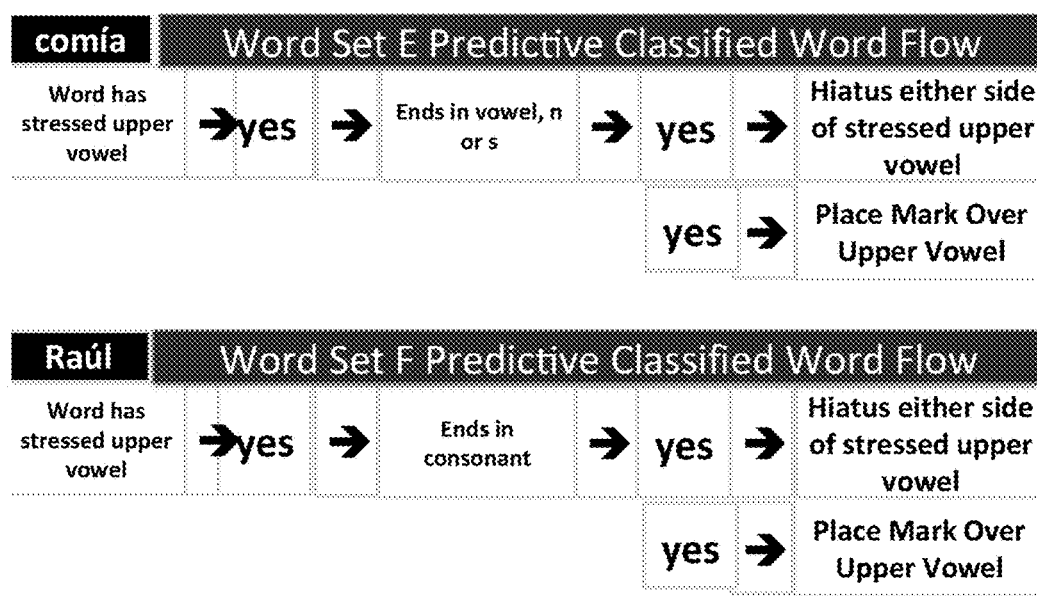
FIG. 3 depicts predictive flow of classified words through word-set processing templates for word sets E and F.

The disclosed computer-based technology processes described herein help learners to process classified words through the word-set processing templates, which can allow learners to experience holistic, synergetic and heuristic procedures that guide them to heuristically apply the rules in a markedly easier manner than the learner is able to do without the processing templates. As seen in FIG. 2 and FIG. 3, example word-set processing templates can be used to provide a global system that presents the salient features to the learner in a predetermined order on a word-by-word basis (on demand) exactly when and how the user needs the salient features to be presented such that the classified word is processed correctly. This process happens for any word in Spanish.

Word-set processing templates can help the learner to heuristically, holistically and quickly integrate the salient features of classified words with the essential features of classified words. After sequential, continual and ordered practice of multiples of classified words belonging to any specific word set, the user can quickly internalize the integration of the salient features of classified words with the essential features of classified words. The learner is also aided in processing each classified word predictively and correctly for any word the learner needs to learn to mark because the methods herein work for each word so that it is processed correctly. As the learner continually processes classified words through their respective word-set processing template/s, the learner also internalizes the ability to guarantee a correct answer and becomes able to automatically carry out the process without the need for using the word-set processing template.

Computer applications (e.g., desktop applications, mobile apps), which can be implemented in software, hardware (e.g., application specific integrated circuits (ASICs), firmware, or any combination thereof, can be programmed to implement word-set processing templates. For example, applications can be programmed to provide user interfaces and interactive features that can prompt users to classify words into their appropriate word sets and to apply tilde placement to the words based on the word sets. Such interfaces and interactive features can be implemented across random words (e.g., one-off words that are entered by the user) and/or as part of a learning sequence (e.g., progression of words within a word set and/or across word sets). The computer applications can additionally be programmed to identify into one or more appropriate learning sequences based on random words as well. For example, a user can enter a random word through a user interface, be provided with appropriate prompts to guide the user to the correct tilde placement, and can then be entered into an appropriate learning sequence of words based on the random word and/or the user's performance with regard to the random word (e.g., successful/unsuccessful tilde placement, successful/unsuccessful word set identification).

Such computer applications can optionally include one or more additional features. For example, computer applications can be programmed to track user progress over time with regard to a variety of factors, such as classification of words into word sets, correct tilde placement with regard to individual words and/or word sets, and/or other appropriate details. Such tracking of user progress can be used to determine, for example, appropriate learning sequences to provide to users. For example, a user who has mastered tilde placement for example word sets A-C but not for example word sets D-F, may be provided with a learning sequence that includes word classification and tilde placement for words within word sets D-F.

Any of a variety of appropriate computing devices can be used to implement such computer applications, such as desktop computers, laptop computers, mobile computing devices (e.g., smartphones, tablet computing devices, wearable computing devices), distributed computing systems (e.g., thin clients running on a client computing device that implements the application through communication with a server system), or any combination thereof.

Various terms are used throughout this document. Below is a glossary for some of these terms.

Alphabetic Content of syllable—a vowel or consonant within any syllable.

Atonic Syllable—any unstressed syllable in a classified word. Any syllable that is not the tonic syllable. Each classified word can have a least one atonic syllable.

Accuracy Confirmed Display—display feature output on a computing device that can inform users of having processed classified word accurately through its respective word-set processing template. Such information can be displayed to user after user accurately processes classified word through word-set processing. This displayed message can appear after user/learner provides input through the last button (does the last step) as learner/user has completed processing the classified word through word-set processing for unmarked words and marked words.

Auto Correct Control Function—output features for a computer application that can provide feedback to users as to whether they are appropriately marking words. For instance, as user interacts with each classified word while processing each classified word through its respective word-set processing template, such a feature (auto correct control function) can provide users with corrective feedback so that users notice the correct action to take while providing input through the corresponding control functions involved in processing each classified word through its respective word-set processing template. For example, a "Try Again" message can be displayed when user presses, for example, a "Yes" button (example control function) when the correct response is "No," and vice versa. In another example, a "Try Again" message can also be displayed when a user provides input indicating that there should be a mark over the stressed syllable (example use of control function Place Mark Over Vowel of Stressed Syllable) when the correct response is No Mark, and vice versa. Such example messages can additionally display the previous screen to user so user can submit a different answer (example input provided through a control function that activates the opposite response). This feedback can force a user to submit answers to correctly process a classified word through its respective word-set processing template.

Auto Correct Answer Feedback—output features for a computer application can informs users that a classified word has been processed correctly through word-set processing template. Automatically activated as a function of the classified word having been correctly processed through word-set processing template.

Button—an example type of control function that can be pressed or otherwise selected by user. Button refers to a specific control function that can be used in combination with word-set processing templates.

Consonant—when used in the context of word-set processing or essential features for word-set processing, consonant includes any consonant except for "n" or "s."

Control Function—this feature can include:
1. any operation that enables user to perform at least one step of word-set processing;
2. any operation that enables a user to carry out any action involved in processing classified word through its respective word-set processing template; and/or
3. any operation that enables user to carry out each action involved in converting each word to a raw word to a classified word.

The following are seven examples of control functions:
1. control function that transfers word to raw word
2. control function that transfers raw word to classified word
3. Word-Ending Control Function
   Does classified word end in a vowel, n or s? Yes/No
   Does classified word end in a consonant that is not an "n" or "s?"
   Users can provide answers to such questions through any of a variety of appropriate input techniques (e.g., touch-screen, voice input, key/button press, motion based input).
4. Tonic Syllable Locator Control Function
   Is the next to last syllable the tonic syllable? Yes/No
   Is the last syllable the tonic syllable? Yes/No
   Users can provide answers to such questions through any of a variety of appropriate input techniques (e.g., touch-screen, voice input, key/button press, motion based input).
5. Does the classified word get a tilde? Control Function
   Does the classified word not get a tilde? Control Function
   Users can provide answers to such questions through any of a variety of appropriate input techniques (e.g., touch-screen, voice input, key/button press, motion based input).
6. Tilde Placer Control Function
   Allows a user to place a tilde on marked words. Last step of word-set processing.
   Users can place tildes on marked words through any of a variety of appropriate input techniques (e.g., touch-screen, voice input, key/button press, motion based input).
7. Auto-correction Control Function
   As user interacts with each classified word while processing classified word through any word-set processing template, upon providing input that incorrectly responds to any control function, computer applications displays corrective feedback to user so that user notices the correct action to take while carrying out each action involved in processing any classified word through any word-set processing template. The display can be equipped with several control functions through which users provide input and allow users to predictively and accurately continue to process the classified word through word-set processing templates. Such predictive actions can cause users to accurately process the resultant outcome of the raw word as it is transformed into either a marked word or an unmarked word.

Classified Word—raw word that has been categorized into one of the templates for word-set processing (for example ABCDEF). A classified word is a raw word that is appropriately categorized for processing through its respective word-set processing templates. Computer applications can predict (know) whether the classified word results in being processed into a marked word or an unmarked word.

Features for word-set processing—criteria used for processing each classified word through each "word-set processing" processing template, and can include 1 and 2 below:
1. The ending is the last letter in each classified word
1.1 Types of classified word endings:
1.1.a Classified word ends in a vowel, n or s
1.1.b Classified word ends in any consonant except for n or s
2. Spotlit syllables
2.1 For each classified word that ends in a vowel, n or s, the spotlit syllable is the penultimate syllable.
2.2 For each classified word that ends in a consonant except for n or s, the spotlit syllable is the last syllable
2.3 When tonic upper-vowel hiatus is found within a classified word, the spotlit syllable is the tonic syllable.
   Hiatus—two adjacent vowels forming two syllables.

1. Tonic upper vowel hiatus: río, púataúd, rí-o, pú-a, atá-ud Tonic upper vowel hiatus has one upper vowel (i or u, marked with a tilde) adjacent to one lower vowel in an adjacent syllable.
2. Lower vowel hiatus: leo, crea le-o, cre-a. Lower vowel hiatus: has one lower vowel adjacent to one lower vowel in an adjacent syllable.

Upper Vowel—i and u

Lower Vowel—a, e, and o

Marked Word—classified words that have been converted into a marked word from having been processed through word-set processing and determined to have a tilde placed over the correct vowel of the tonic syllable of the marked word.

Post-tonic Syllable—the syllable that immediately follows the tonic syllable.

Predictive-Output Enablement—features used in computer applications to allow for each classified word processed through a discrete word-set processing template to be processed such that the resultant output is the same for each classified word processed through that discrete word-set processing template. For example, each classified word processed through Word-set B can be processed into a marked word. Each classified word processed through Word-set C can be processed into an unmarked word and so on for Word Sets ABCDE and/or F.

Pretonic Syllable—the syllable that immediately precedes the tonic syllable.

Raw Word—a raw word is a word that has been stripped of markings, such as tildes. Tildes can be removed from each marked word such that marked word is transformed into a raw word such that the raw word is ready to be categorized into a classified word to be processed through the classified word's respective word-set processing template.

Words can be stored in one or more databases. Each word in a database can be spelled accurately as each word is found, for example, in a Spanish dictionary. Computer applications can transform words into raw words so that raw words can be converted into a classified word. Then the classified words can be processed through word-set processing by users.

For example,
1. a computer application can fetch words from databases. Words can either be marked or unmarked.
2. From each marked word, the computer application can removes the tilde to convert the word into a raw word.
3. From each unmarked words, the computer application may not remove a tilde. Unmarked words have no tilde.
4. So both each marked word and each unmarked word is converted into a raw word and then each raw word is converted into a classified word and is processed through its respective word-set processing template.

After having been processed through word-set processing, each classified word is transformed into either an unmarked word or a marked word in that the classified word either receives a tilde, as in está, or doesn't receive a tilde, as in casa. Because word-set processing forces the user to process each classified word correctly (with regard to spelling), each classified word can be transformed into a correctly-spelled word by a user.

Reverse Word-Set Processing—instead of processing a classified word through word-set processing to place a mark on the word, user can process marked words through word-set processing in reverse and demonstrate why the word is either a marked word or an unmarked word. Such reverse processing can include identifying some or all of the same characteristics of words (e.g., upper vowel hiatus, word ending, tonic syllable) as with regard to regular word-set processing, but in reverse.

Salient Syllables—each classified word's pretonic syllable, tonic syllable and/or posttonic syllable can be considered to be salient syllables.

Salient Features of Classified Words—features of classified words that can be processed and used during word-set processing, which may need to be learned by a user to become proficient at tilde placement according to the rule set for accentuation of words in Spanish.

Examples of Salient features of classified words can include:
1) final letter of classified word,
2) the spotlit syllable of classified word,
3) the tonic syllable of classified word,
4) whether the spotlit syllable and the tonic syllable are the same syllable result in unmarked words or whether the spotlit syllable and the tonic syllable are not the same syllable result in marked words,
5) that the spotlit syllable of a classified word is a function of the whether the final letter of a classified word is a consonant excluding an "n" or an "s" or whether the final letter of a classified word is a vowel, an "n" or an "s",
6) the pretonic syllable of a classified word and the pretonic syllable's interrelationship with the tonic syllable,
7) the posttonic syllable of a classified word and posttonic syllable's interrelationship with the tonic syllable,
8) that the spotlit syllable of each classified word is either the final syllable or the penultimate syllable,
9) that the tonic syllable of any classified word that ends in a consonant (except n or s) is either the final syllable or the penultimate syllable,
10) that the tonic syllable of any classified word ending in an "n," an "s" or a vowel is one of the last four syllables of the classified word,
11) that the tonic syllable can be focused upon visually and aurally,
12) hiatus occurs in word-sets E and F,
13) that salient features exist and these salient features' constituent parts can be found in classified words,
14) noticing, recognizing and internalizing the interrelationship of any multiple of salient features, and
15) converting input into implicit knowledge.

Spotlit Syllable—the syllable onto which focus is placed as user is processing classified word through word-set processing. The spotlit syllable is either the last syllable or the penultimate syllable for all words in Word-Set A,B,C, or D. For words in Word-Set E or F, the spotlit syllable can be the tonic syllable.

Structured Word—can be a classified word which include one or more of:
1) also becomes structured word as the classified word is being processed through word-set processing. As the classified word is being processed through word-set processing, distinct salient features are identified and emphasized by software as the classified word also becomes a structured word. This identification and emphasis of salient features facilitate the noticing and internalization by learner of the salient features of classified words. As a result the learner learns the process of correctly placing tildes on words in Spanish.
2) is syllabified
3) final letter is identified
4) tonic syllable is identified
5) salient syllables are identified
6) spotlit syllable is identified Tonic Syllable—the vocally stressed syllable in each word with more than 1 syllable.

Tilde—written accent mark over one specific vowel in each marked word.

Tilde Placer Control Function—user interface features through which users can place tildes onto marked words. This can be used in the last step of word-set processing.

Unmarked Word—word without accent marks. For example, any classified word that has been converted into an unmarked word from having been processed through its respective word-set processing template and determined not to have a tilde placed can be an unmarked word. After having been processed through word-set processing, every classified word in Spanish can be considered either an unmarked word or a marked word in that each classified word either receives a tilde, as in está, or doesn't receive a tilde, as in casa.

Word-set Control Functions—control functions that provide control features (e.g., user interfaces) that are used by users to, for example, process classified words through word-set processing. Example word-set control functions can include:

1. Word-Ending Control Function

Does classified word end in a vowel, n or s? Yes/No

Does classified word end in a consonant that is not an "n" or "s?"

Users can provide responses to such questions through any of a variety of appropriate user interfaces (e.g., touchscreen user interface, voice user interface, graphical user interface, motion based user interface).

2. Tonic Syllable Locator Control Function

Is the next to last syllable the tonic syllable? Yes/No

Is the last syllable the tonic syllable? Yes/No

Users can provide responses to such questions through any of a variety of appropriate user interfaces (e.g., touchscreen user interface, voice user interface, graphical user interface, motion based user interface).

3. Does the classified word get a tilde? Control Function

Does the classified word not get a tilde? Control Function

Users can provide responses to such questions through any of a variety of appropriate user interfaces (e.g., touchscreen user interface, voice user interface, graphical user interface, motion based user interface).

4. Tilde Placer Control Function

Allows for tilde placement on marked words. Can be last step of word-set processing.

Users can provide input to place tildes through any of a variety of appropriate user interfaces (e.g., touchscreen user interface, voice user interface, graphical user interface, motion based user interface).

5. Auto-correction Control Function, described above.

Word-Set—classified words in Spanish can be categorized into distinct word sets. This categorization can be used by computer applications to accurately fetch and place raw words into their respective word-set processing templates transforming the raw word into a classified word so that user can process each classified word accurately and predictively through the word-set processing template. Classified words can be categorized into one of a plurality of word sets, such as word sets A, B, C, D, E, and F, which are described below.

Figure for Word Sets ABCD

| Word Set A Unmarked Words | Word Set B Marked Words | Word Set C Unmarked Words | Word Set D Marked Words |
|---|---|---|---|
| Ends in Vowel, n, or s? yes Stress on Penultimate Syllable? yes Yes/Yes Spotlit Syllable is the Penultimate Syllable as a function of Classified Word Ending | Ends in Vowel, n, or s? yes Stress on Penultimate Syllable? No Yes/No Spotlit Syllable is Penultimate Syllable as a function of Classified Word Ending | Ends in Consonant? yes Stress on Last Syllable? yes Yes/Yes Spotlit Syllable is the Last Syllable as a function of Classified Word Ending | Ends in Consonant? yes Stress on Last Syllable? no Yes/No Spotlit Syllable is the Last Syllable as a function of Classified Word Ending |

Figure for Word Sets EF

| Word Set E Marked Words | Word Set F Marked Words |
|---|---|
| Ends in Vowel, n, or s? yes Has stressed upper vowel? yes Has hiatus on either side of stressed upper vowel? Yes yes/yes/yes Spotlit Syllable is the Tonic Syllable | Ends in Consonant? yes Has stressed upper vowel? Yes Has hiatus on either side of stressed upper vowel? Yes yes/yes/yes Spotlit Syllable is the Tonic Syllable |

A, B, C, and D can have distinguishing criteria based on:
1. Word ending and 2. Whether spotlit syllable is the tonic syllable or whether spotlit syllable is not the tonic syllable.
1. Classified word ending either:
   a. A Vowel, an "n" or an "s" or
   b. A consonant that is not an "n" or an "s".
Each classified word falls into one of two categories: 1) ends in either a vowel, an "n" or an "s" or 2) ends in a consonant that is not an "n" or an "s".
2. Spotlit syllable is the tonic syllable or spotlit syllable is not the tonic syllable. The spotlit syllable is the penultimate syllable if the classified word ends in a vowel, an "n" or an "s." The spotlit syllable is the last syllable if the classified word ends in a consonant.

Each classified word processed through word sets A and C can result in unmarked word (doesn't get a tilde) after being processed through its respective word-set processing template. Each classified word processed through word sets B and D can result in marked word (does get a tilde) after being processed through its respective word-set processing template. This allows the computer application to accurately predict the resultant outcome of each classified word after being processed through the word's respective word-set processing template.

EF Word Sets

E and F word sets can use unique word-set processing templates in that the spotlit syllable is the tonic syllable and there is upper vowel hiatus in Word Set E and also in Word Set F. Distinguishing Criteria per word set for word sets E and F are:

Word Set E=Classified words that 1) end in a vowel, n, or s, 2) have a tilde over the tonic upper vowel, 3) have hiatus on either side of stressed upper vowel.

Word-set F=Classified words that 1) end in a consonant other than n, or s 2) have a tilde over the tonic upper vowel 3) have hiatus on either side of stressed upper vowel.

Upper vowels=i, u

Hiatus=two adjacent vowels that make up two syllables as in río=rí-o or Raúl=Rá-ul.

Each classified word processed through word sets E and F can result in marked word (does get a tilde) after being processed through word-set processing.

Word Set Processing—can include:
1) Word-set processing can predict the resultant outcome of each classified word: whether each classified word is transformed into an unmarked word or a marked word.
2) Word-set processing can be user activated and operated and is a distinct and exact type of process. Not only is it user activated and operated, word-set processing can also be automatically displayed for user to view without the user providing input through control functions.
3) Word-set processing can include the conversion of a classified word into either a marked word or an unmarked word.
4) As a classified word is being processed through word-set processing, the computer application can identify at least one of each classified word's salient features.
5) Before classified word is processed through word-set processing, users may not know if the classified word is a marked word or an unmarked word. So user doesn't know if classified word is spelled correctly or not. Word-set processing accurately guides user so that user is forced to process classified word correctly. Before classified word is processed, computer applications can determine and predict the resultant outcome of each classified word: either a marked word or an unmarked word.
6) Word-set processing raises user's consciousness regarding interrelationship of salient syllables with essential features of any classified word such that user internalizes how to process classified words into output. User converts input into implicit knowledge and learns the process of tilde placement.

Word-set processing a word through A, B, C, D, E or F processing means is processing each raw word through the A,B,C,D,E and/or F yes/no algorithms. Each raw word that is being processed through word-set processing has 3 classifications:
1. raw word=see glossary
2. classified word=see glossary
3. structured word=see glossary.

Each raw word can be processed through the yes/no algorithms utilized in word-set processing. Multiple classified words of the same word set can be processed through the A, B, C, D, E and/or F algorithms.

FIG. 1 depicts an example technique that can be used as part of a computer application. As depicted in FIG. 1, a Spanish word can be received by the computer application, such as through user input (e.g., user typing the word into a user interface, saying the word into a microphone) and/or from a collection of words (e.g., text file of Spanish words). Such words can include tilde characters. To use the words for teaching purposes, the tilde characters can be stripped out of the words to generate raw words. This can involve converting, for example, ASCII characters with accent marks to corresponding ASCII characters without accent marks (e.g., converting from ASCII character 'é' (code 130) to ASCII character 'e' (code 101)).

Computer applications can use the raw words to provide users with a user interface through which users are prompted to classify words into appropriate classifications (e.g., classify into word sets A-F) and, based on the classifications, to apply one or more accent marks to the words. Based on the users' classification and placement of accent marks, feedback can be output to users by the computer applications to help reinforce correct behaviour (e.g., correct classifications, correct placement of accent marks) and/or to help users identify and remedy mistakes that were made (e.g., incorrect classification, incorrect accent mark placement).

For example, computer applications can aid users in classifying words in Spanish into distinct word sets (each Spanish word can be a member of one of a plurality of word sets). This classification can be used by computer applications so as to accurately place each raw word into its respective word-set processing template transforming the raw word into a classified word so that user can process each classified word accurately and predictively through its respective word-set processing template (each word set can have one or more corresponding word-set processing templates), which can be used by computer applications to determine prompts (e.g., type of prompts, sequence) to provide to a user for the word. Each classified word can be categorized into one word set from a group of word sets that includes, for example, word sets A, B, C, D, E and F. There can be a total of 6 word sets (word sets A-F). Word sets A, B, C, and D can be four word sets that do not include hiatus (word with two or more joined vowels that can be separated into different syllables) with a tonic upper vowel in words encountered within these word sets. Word set E and F do include hiatus with a tonic upper vowel in words encountered within these word sets. These features (presence of hiatus with tonic upper vowel) can be used as criteria to distinguish each word set from the other word sets, and to classify words into appropriate word sets. These and other features can also be used to process each classified word through "word-set processing" processing templates that correspond to the word sets.

Examples of such features for word-set processing are depicted in FIG. 6 and FIG. 7. For instance, referring to FIG. 6, distinguishing features for each of the four word sets A, B, C and D include 1) the word's ending (e.g., end in vowel, 'n', 's', or consonant) and 2) whether the spotlit syllable (last or second to last syllable) is the tonic syllable (syllable with emphasis) or the spolit syllable is not the tonic syllable. Each classified word processed through word sets A and C may always result in an unmarked word (does not get a tilde) after being processed, by a computer application, through the respective word-set processing templates for word sets A and C. Each classified word processed through word sets B and D may always result in marked word (does get a tilde) after being processed, by a computer application, through the respective word-set processing templates for word sets B and D.

EF Word Sets

Referring to FIG. 7, each classified word processed, by a computer application, through word sets E and F may always result in a marked word (does get a tilde) after being processed through the respective word-set processing templates for word sets E and F. The distinguishing criteria that can be used for the word sets E and F can be similar to those for word sets A-D, and can include 1) word endings, 2) whether the spotlit syllable is the tonic syllable, and 3) whether there is upper-vowel hiatus as illustrated in FIG. 7. E and F word-set processing templates are distinct from A, B, C and D word-set processing templates in that: 1) the spotlit syllable is the tonic syllable, and 2) there is an upper vowel hiatus in words encountered in Word Set E and also in words encountered in Word Set F. Distinguishing criteria for word set E are 1) classified words that end in a vowel, n or s, 2) have a tilde over the tonic upper vowel, 3) have hiatus on either side of the stressed upper vowel. Distinguishing criteria for word set F are 1) classified words that end in a consonant except for n or s, 2) have a tilde over the tonic upper vowel, 3) have hiatus on either side of the stressed upper vowel.

This system of classification can create word-sets A, B, C, D, E and F. This system of classification can allow a computer application to accurately guide the user through each of the corresponding word-set processing templates so that the user learns to correctly apply the rule set for accentuation in Spanish to each classified word.

FIG. 2 depicts a block diagram showing a process flow for words in each of the word sets A, B, C and D. The example process flows can be implemented by any of a variety of appropriate computing devices and/or computer systems, such as a laptop, desktop computer, mobile computing devices (e.g., smartphones, tablet computing devices, wearable computing devices), client-server computer systems, and/or other appropriate computing devices. Such computing devices can provide one or more appropriate prompts based on the appropriate classifications for the word sets A-D.

Referring to the first example process flow in FIG. 2 for word set A, the example word "semana" is processed through a word-set processing template for classified words in word set A. For instance, a user would first be prompted (by a computing device/computer system) to determine whether the word "semana" ends in a vowel, n, or s. In response to answering "yes," the user would be prompted to determine whether stress is placed on the penultimate syllable. In response to answering "yes," the user would then be informed (and/or prompted to indicate) that the word "semana" is in word set A, in which words are not marked.

Referring to the second example process flow in FIG. 2 for word set B, the example word "corto" is processed through a word-set processing template for classified words in set B. For instance, a user would first be prompted (by a computing device/computer system) to determine whether the raw word "corto" (without accent mark) ends in a vowel, n, or s. In response to answering "yes," the user would be prompted to determine whether stress is placed on the penultimate syllable. In response to answering "no," the user would then be informed (and/or prompted to indicate) that the word "corto" is in word set B, in which words are marked over the vowel of the stressed syllable resulting in the word "cortó."

Referring to the third example process flow in FIG. 2 for word set C, the example word "verdad" is processed through a word-set processing template for classified words in set C. For instance, a user would first be prompted (by a computing device/computer system) to determine whether the raw word "verdad" ends in a consonant. In response to answering "yes," the user would be prompted to determine whether stress is placed on the last syllable. In response to answering "yes," the user would then be informed (and/or prompted to indicate) that the word "verdad" is in word set C, in which words are not marked.

Referring to the fourth example process flow in FIG. 2 for word set D, the example word "arbol" is processed through a word-set processing template for classified words in set D. For instance, a user would first be prompted (by a computing device/computer system) to determine whether the raw word "arbol" (without accent marks) ends in a consonant. In response to answering "yes," the user would be prompted to determine whether stress is placed on the last syllable. In response to answering "no," the user would then be informed (and/or prompted to indicate) that the word "arbol" is in word set D, in which words are marked over the vowel of the stressed syllable resulting in the word "árbol."

FIG. 3 depicts a block diagram showing a process flow for words in each of the word sets E and F. Like the example process flows for word sets A-D described above with regard to FIG. 2, the example process flows for word sets E and F can be implemented by any of a variety of appropriate computing devices and/or computer systems, such as a laptop, desktop computer, mobile computing devices (e.g., smartphones, tablet computing devices, wearable computing devices), client-server computer systems, and/or other appropriate computing devices. Such computing devices can provide one or more appropriate prompts based on the appropriate classifications for the word sets E and F.

Referring to the first example process flow in FIG. 3 for word set E, the example word "comia" is processed through a word-set processing template for classified words in set E. For instance, a user would first be prompted (by a computing device/computer system) to determine whether the raw word "comia" (without accent marks) has a stressed upper vowel. In response to answering "yes," the user would be prompted to determine the word ends in a vowel, n, or s. In response to answering "yes" to that prompt, the user would then be prompted to determine whether there is a hiatus on either side of the stressed upper vowel. In response to determining that there is a hiatus on either side of the stressed upper vowel, the user would then be informed (and/or prompted to indicate) that the word "comia" is in word set E, in which words are marked over the upper vowel resulting in the word "comía."

Referring to the second example process flow in FIG. 3 for word set F, the example word "raul" is processed through a word-set processing template for classified words in set F. For instance, a user would first be prompted (by a computing device/computer system) to determine whether the raw word "raul" (without accent marks) has a stressed upper vowel. In response to answering "yes," the user would be prompted to determine the word ends in a consonant. In response to answering "yes" to that prompt, the user would then be prompted to determine whether there is a hiatus on either side of the stressed upper vowel. In response to determining that there is a hiatus on either side of the stressed upper vowel, the user would then be informed (and/or prompted to indicate) that the word "raul" is in word set F, in which words are marked over the upper vowel resulting in the word "Raúl."

Figure 24:
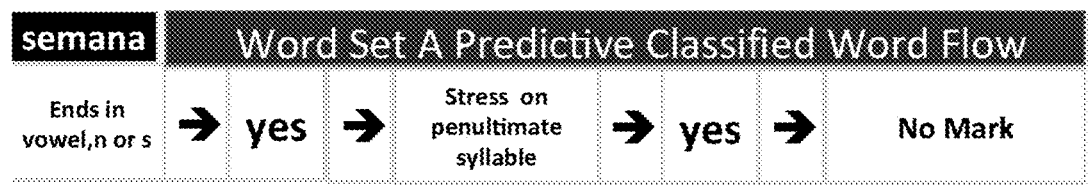
FIG. 24 depicts predictive flow of classified words through word-set processing templates for word set A.
Figure 25:
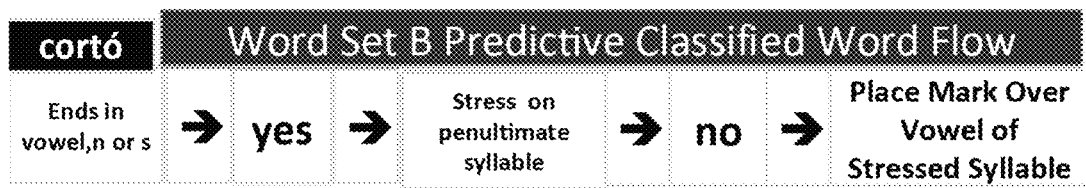
FIG. 25 depicts predictive flow of classified words through word-set processing templates for word set B.
Figure 26:
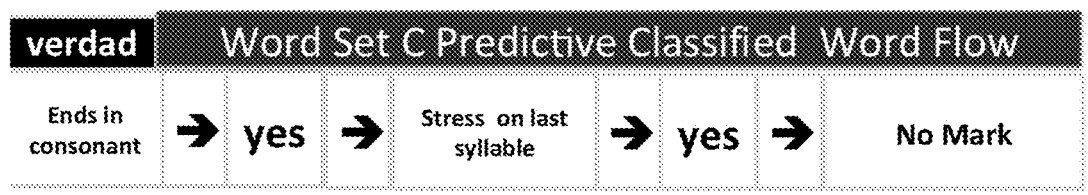
FIG. 26 depicts predictive flow of classified words through word-set processing templates for word set C.
Figure 27:
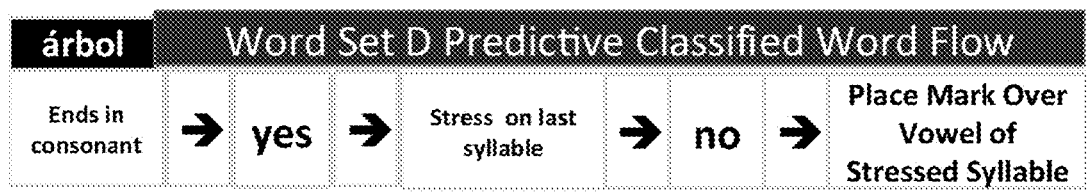
FIG. 27 depicts predictive flow of classified words through word-set processing templates for word set D.
Figure 28:
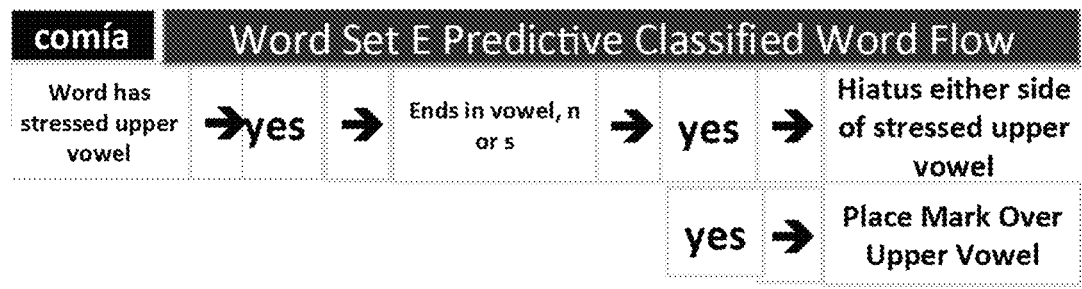
FIG. 28 depicts predictive flow of classified words through word-set processing templates for word set E.
Figure 29:
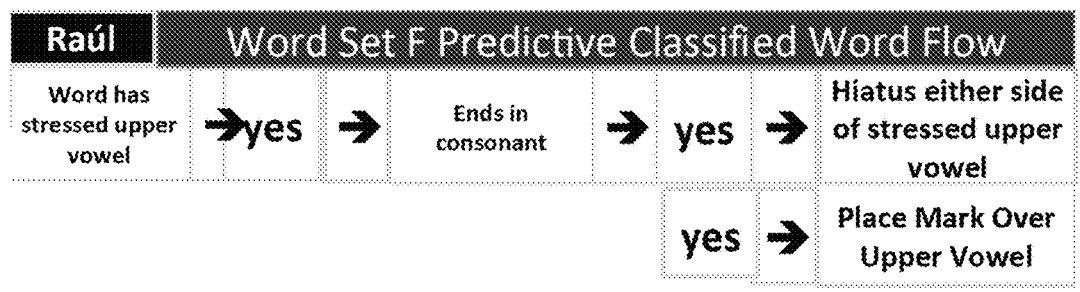
FIG. 29 depicts predictive flow of classified words through word-set processing templates for word set F.

Each raw word that meets the criteria for word-set A as seen in FIG. 6 is classified into word-set A and can be predictively processed as seen in FIG. 24. Each raw word that meets the criteria for word-set B as seen in FIG. 6 is classified into word-set B and can be predictively processed as seen in FIG. 25. Each raw word that meets the criteria for word-set C as seen in FIG. 6 is classified into word-set C and can be predictively processed as seen in FIG. 26. Each raw word that meets the criteria for word-set D as seen in FIG. 6 is classified into word-set D and can be predictively processed as seen in FIG. 27. Each raw word that meets the criteria for word-set E as seen in FIG. 7 is classified into word-set E and can be predictively processed as seen in FIG. 28. Each raw word that meets the criteria for word-set F as seen in FIG. 7 is classified into word-set F and can be predictively processed as seen in FIG. 29.

Additional example words for word sets A, B, C and D are illustrated in FIG. 4. FIG. 5 illustrates additional example words for word sets E and F. The features for each word set A, B, C, and D are depicted in FIG. 6. The features for each word set E and F are depicted in FIG. 7. Such features include criteria that distinguish each word set from the other word sets.

Notes on Word Set Processing

1) Word-set processing can predict the resultant outcome of each classified word: whether each classified word is transformed into an unmarked word or a marked word. 2) Word-set processing can be user activated and operated, and can also be automatically displayed for user to view without the user prompting various features of control functions. 3) Word-set processing can include converting classified word into either a marked word or an unmarked word. 4) Before classified words are processed through word-set processing, users may not know if the classified word is a marked word or an unmarked word—meaning users may not know if a classified word is spelled correctly or not. Word-set processing can accurately guide users so that users are forced to process classified word correctly. Before classified words are processed, computer applications can determine and predict the resultant outcome of each classified word: either a marked word or an unmarked word. 5) Word-set processing can raise users' consciousness regarding interrelationship of salient syllables with features of any classified word such that user internalizes how to process classified words into output. User converts input into implicit knowledge and learns the process of tilde placement.

Example Processing of the Word "Cortó:"

Cortó:

FIGS. 11, 12, 13, 14 and 15 depict "learning by doing" as the learner interacts with a multiple of salient features (depicted in FIG. 21)—simultaneous to interacting with an exemplary word through word-set processing template for word-set B.

FIGS. 8, 9, 10, 11, 12, 13, 14, 15, 16 and 17 depict the classified word "corto" being processed through an exemplary word-set processing template for word set B. As depicted in FIGS. 8,9,10,11,12,13,14,15,16, and 17, exemplary salient features of classified words are organized and ordered in such a way as to guarantee a correct answer (correctly marked classified word). As the classified word "corto" is processed through word-set processing template, these salient features are illustrated figure by figure for FIGS. 8,9,10,11,12,13,14,15,16, and 17.

FIGS. 8,9,10,11,12,13,14,15,16 and 17 depict the detailed flow of an example word, corto, from word set B being processed according to the example process depicted in FIG. 25. FIG. 25 is a block diagram illustrating the basic flow of each classified word (of word-set B) as it is processed through word-set processing template.

Figure 8:
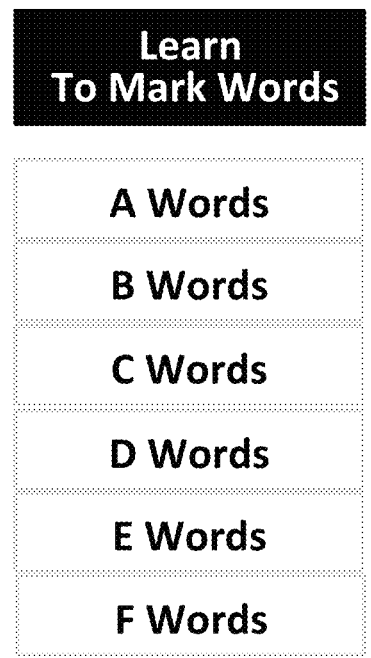
FIG. 8 depicts a list of word sets; any of which can be selected by user.
Figure 9:
FIG. 9 depicts a list of raw words in word set B; any of which can be selected by user.
Figure 10:
FIG. 10 depicts a device for entering any word for categorizing into its respective word set and for processing through word-set processing template.

User has the option to enter any word as depicted in FIG. 10 or choose a class of word sets to practice and process from the database as depicted in FIG. 8. In this exemplary case, user opts to choose from a list of word sets provided by software as seen in FIG. 8. FIG. 8 depicts a block diagram of word sets A, B, C, D, E and F. User reviews options and uses the depicted example user interface to select word set B from among the six word sets. After (or before) the user selects word set B, the computer application providing the user interface can convert and/or retrieve one or more words from database as raw words, such as words for word set B. The computer application can fetch, for example, multiple of raw words from word set B and displays them for user to review and select as can be seen from FIG. 9. The user can select any one of all the exemplary words and/or word sets by selecting the corresponding word and/or word set from the example user interfaces that are displayed by a computing device and depicted in the figures.

FIG. 10 depicts an exemplary user interface through which a user can enter any word he/she needs to practice. For example, a user can enter any word (e.g., raw word) he/she wants to process and can select the "return" key. After user has entered a raw word, a computer application providing the user interface can classify the user-entered raw word into its respective word-set processing template for processing by user. In the depicted example, the word "corto" can be categorized into word set B as seen in FIG. 9.

FIG. 9 depicts a block diagram of a multiple of raw words. Note: all raw words displayed in the block diagram as seen in FIG. 9 are of word set B. User reviews displayed options and can select "corto." "Corto" is displayed in word set B and is a marked word but has been converted to a raw word so that the raw word is displayed to user without a tilde. Any raw word selected from word set B is processed through the word set processing template in an identical manner utilizing the essential features of raw words categorized into word set B.

Figure 11:
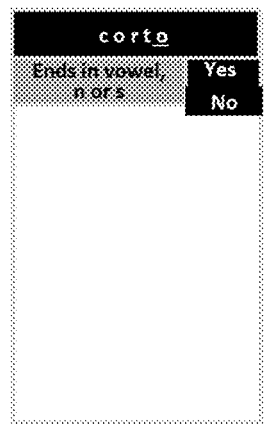
FIG. 11 depicts word-ending control function.
Figure 12:
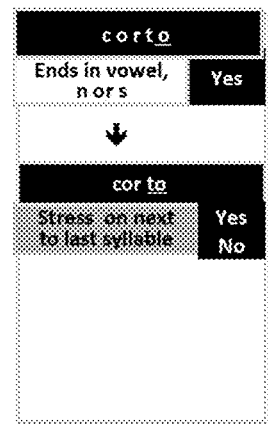
FIG. 12 depicts tonic syllable locator control function.

The subsequent user interfaces and prompts help a user to notice and learn the interrelationship among the raw words (all belonging to word set B) displayed in the block diagram. After user select or enters the word "corto," the underlying computer application can retrieve a word-set processing template for word set B and can begin to process the word "corto" through the word-set processing template for word set B, as depicted in FIG. 11. For example, a user can first be presented with an option to choose Yes or No to respond to the message to determine the classified word ends in a vowel, an "n" or an "s." The user interface can highlight (e.g., underline, present in different color) the portion of the word that is at issue for the question, which in this case is depicted as underlining the last letter of the word "corto." In response to the prompt/question, a user can determine a Yes/No response (e.g., selection of Yes or No user interface features, verbal Yes or No response, motion-based input) to affirm that word ends in a vowel, an "n," or an "s." For example, the user can select either the "yes" button or the "no" button presented in the user interface in FIG. 11. When user selects Yes (the correct response), the computer application can display the subsequent screen as depicted in FIG. 12 so that the classified word "corto" can continue to be processed.

When user selects No in FIG. 11, then the computer application can display a message that informs user he/she made an inaccurate selection and gives user one-option control function Try Again so user can select the Try Again option and return to previous screen and answer correctly.

Note regarding predictability and autocorrection: any time the user erroneously selects a control function, the computer application displays an appropriately-correct control function (autocorrect control function) such that the user can select the appropriately-correct control function in order to continue predictively processing the classified word through word-set processing template. Computer applications can prohibit the erroneous selection of the appropriately correct control function without displaying the autocorrect control function.

Figure 17:
FIG. 17 depicts accuracy confirmed display.

As user interacts with classified word while processing classified word through word-set processing template, user receives corrective feedback so that user notices the correct action to take while carrying out each action involved in processing each classified word through its respective word-set processing template. As depicted in FIG. 17, "Try Again" message appears when user taps Yes when the correct response is No, or when user taps No when the correct response is Yes. As seen in FIG. 17, "Try Again" message also appears when user taps "Place Mark Over Vowel of Stressed Syllable" when the correct response is "No Mark." "Try Again" message also appears when user taps "No Mark" when the correct response is "Place Mark Over Vowel of Stressed Syllable." "Try Again" message is equipped with a "Try Again" control function that displays the previous screen to user so user can choose the opposite response. This feedback forces correct processing of the classified word through word-set processing template.

"Cortó" is a marked word as it is stored in database (spelled correctly in the database). Computer applications can transform this word, such as in a database, into a raw word and then can transform the raw word into a classified word ready to be processed through word-set processing so user can learn through interacting with classified word (processing it through word-set processing template) that "corto" gets a tilde as in "cortó." Note: This is an exemplary word-set processing template where user begins the process of word-set processing each classified word.

FIG. 12 depicts an example two sections of word-set processing with a principle focus on the tonic syllable and the spotlit syllable. The first section of word-set processing which focuses on the final letter of the classified word and the second section of word-set processing which focuses on the tonic syllable and the spotlit syllable are depicted in FIG. 12. FIG. 11 also depicts the first section of word-set processing. For example, FIG. 12 depicts the user being prompted to determine whether the stress is on the next to last syllable for the word corto. The word is broken into syllables—"cor" and "to"—to aid the user in determining whether the next to last syllable, which happens to be the first syllable in this example, is stressed. A variety of additional aids may be provided to users, such as Spanish text to speech module that can audibly pronounce the word "corto" in Spanish to the user. Similar to FIG. 11, the user is provided with user interface features (e.g., buttons, verbal input queues) through which the user can indicate "yes" or "no" in response to the prompt.

Figure 13:
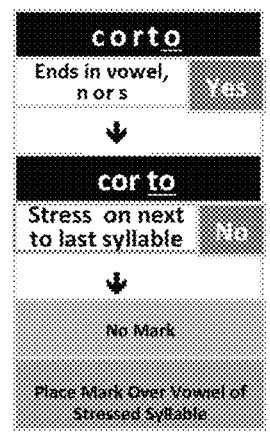
FIG. 13 depicts Does the classified word get a tilde? control function and Does the classified word not get a tilde? control function.

FIG. 13 depicts a block diagram of three sections of word-set processing. The first two sections are similar to those depicted in FIGS. 11 and 12, along with the designated (and correct) user responses, and the third section focuses on whether the classified word being processed results in a marked word or results in an unmarked word. For example, the user can be provided with a view of their previous responses—the Yes response regarding the final letter of the classified word and of the No response to the tonic syllable not constituting the spotlit syllable—to help in determining whether a mark should be placed over the vowel of the stressed syllable. That information (prompts and user responses) is criteria that is used to help a user determine and learn when and where marks should be placed on words. A user can select either of the options "Place Mark Over Vowel of Stressed Syllable" or "No Mark" options. In response to the user selecting the correct option (place mark over stressed syllable), the user interface can display the subsequent word-set processing template as depicted in FIG. 14.

Figure 14:
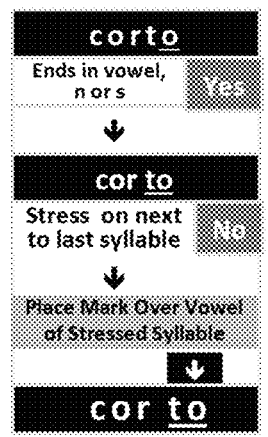
FIG. 14 depicts tilde placer control function.
Figure 15:
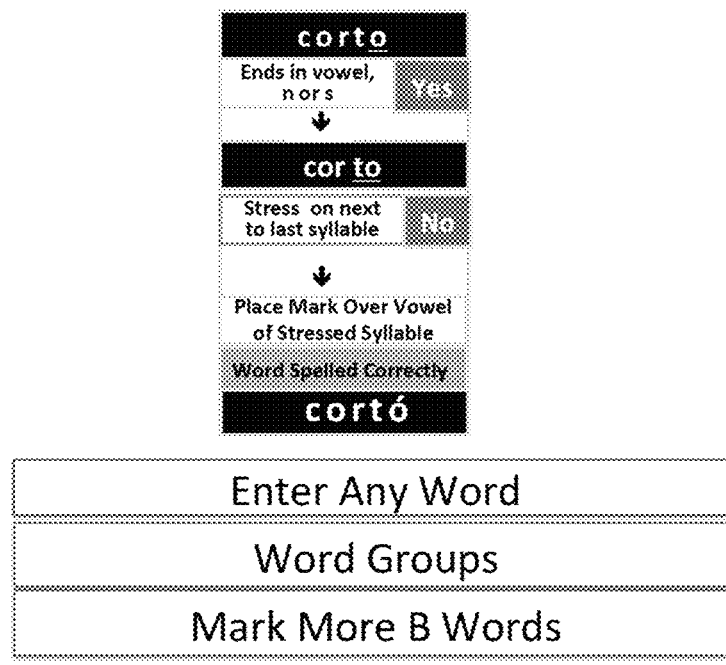
FIG. 15 depicts message informing user of correctly marking classified word.
Figure 16:
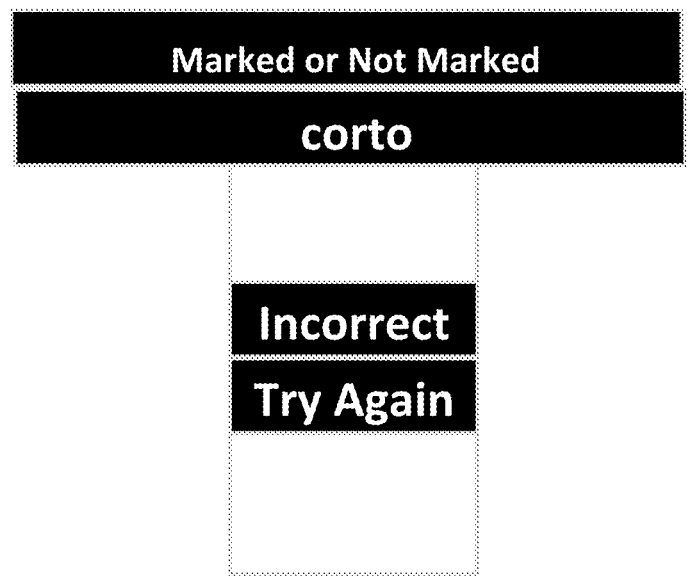
FIG. 16 depicts auto correction display.

FIG. 14 is a block diagram depicting three correctly-completed sections of word-set processing and also a Tilde Placer Control Function (exemplary downward pointing arrow) that a user can select and/or adjust to place a tilde over the appropriately correct vowel of the classified word being processed through word-set processing template. After user places the tilde using the Tilde Placer Control Function, the user interface can display a subsequent message depicted in an exemplary block diagram (as seen in FIG. 15) informing user that user has correctly processed the classified word into a marked word (cortó). FIG. 15 depicts the flow and content the (salient features) necessary so that the resultant outcome of the classified word being processed is correct and predictable, which can be helpful to a user in understanding the patterns and criteria to properly place accent marks. As depicted in FIG. 15, the presentation to user of a multiple of salient features are ordered such that the computer application accurately predicts the outcome of each classified word after being processed through word-set processing template for word-set B.

FIGS. 11, 12, 13, 14 and 15 are example user interfaces that are presented by an example computer application for the example classified word corto, which is processed through word-set processing for word-set B. These same or similar user interfaces can be presented for processing the other word sets A and C-F using the process flows described above with regard to FIGS. 2 and 3.

FIGS. 30A-F are screenshots of user interfaces that can be presented for processing an example word from word set A. These example user interfaces can be output by any of a variety of appropriate computing devices (e.g., laptop, desktop computer, mobile computing devices) as part of a computer application (e.g., mobile app) that is running on the computing devices and processing a word from word set A (depicted example word "modo") using a process for word set A, such as those depicted in FIGS. 2 and 24.

FIG. 30A depicts a user interface prompting a user to identify an ending for the example word "modo" from word set A and FIG. 30B depicts a user interface informing the user he/she provided an incorrect answer ("no" from FIG. 30A). FIG. 30C depicts a user interface prompting a user to identify whether the stress for the example word "modo" is on the second to last syllable, and includes previous correct answers that have been provided by the user for the word at issue ("modo"). FIG. 30D depicts a user interface prompting the user to identify whether or not an accent mark should be placed over the vowel of the stressed syllable, and includes previous correct answers for the ending of the word and stress for the word at issue. FIG. 30E depicts a user interface prompting the user to verify his/her answer that there should not be a mark on the word "modo" and FIG. 30F depicts a user interface with a message indicating that the user correctly identified that the word "modo" should not receive an accent mark.

FIGS. 31A-K are screenshots of user interfaces that can be presented for processing an example word from word set B. These example user interfaces can be output by any of a variety of appropriate computing devices (e.g., laptop, desktop computer, mobile computing devices) as part of a computer application (e.g., mobile app) that is running on the computing devices and processing a word from word set B (depicted example word "carton") using a process for word set B, such as those depicted in FIGS. 2 and 25.

Figure 31A:
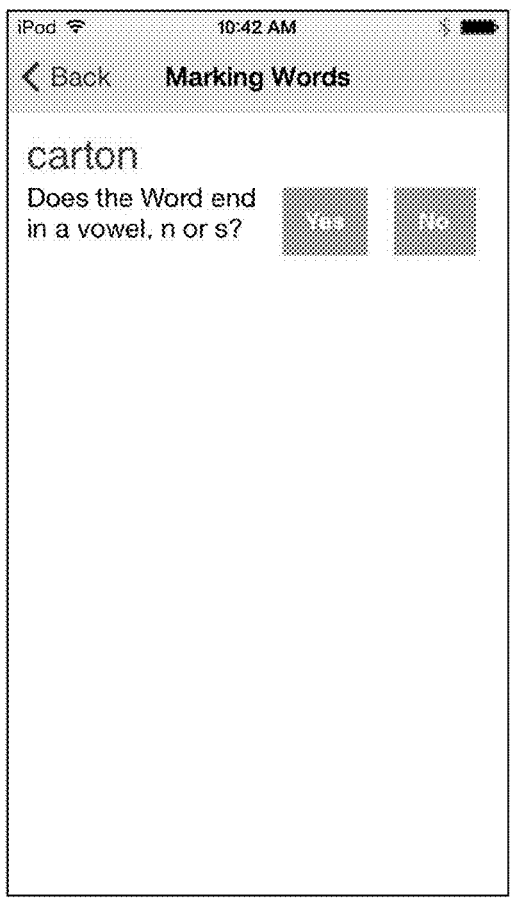
FIGS. 31A-K are screenshots of user interfaces that can be presented for processing an example word from word set B.
Figure 31B:
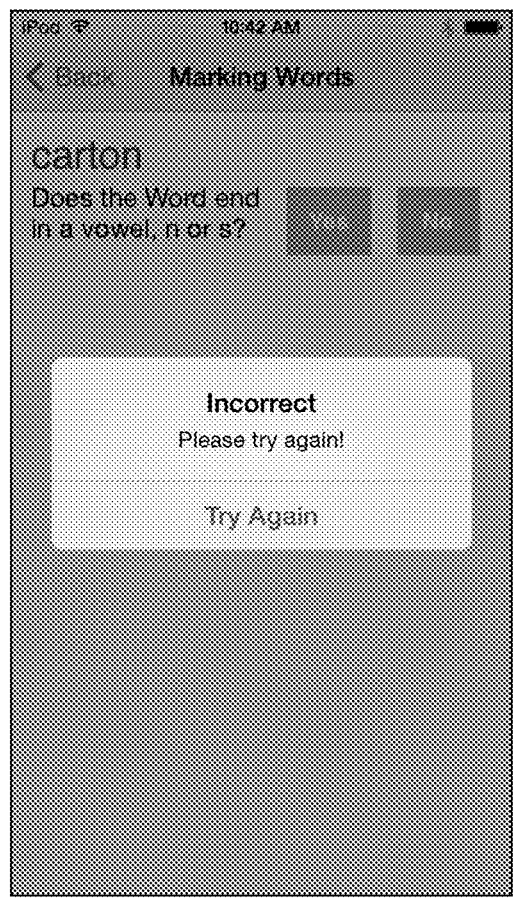
Figure 31C:
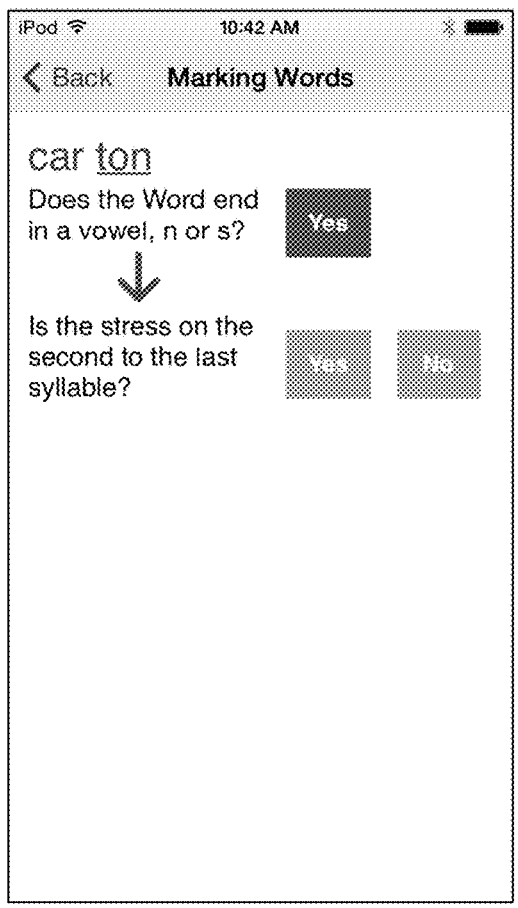
Figure 31D:
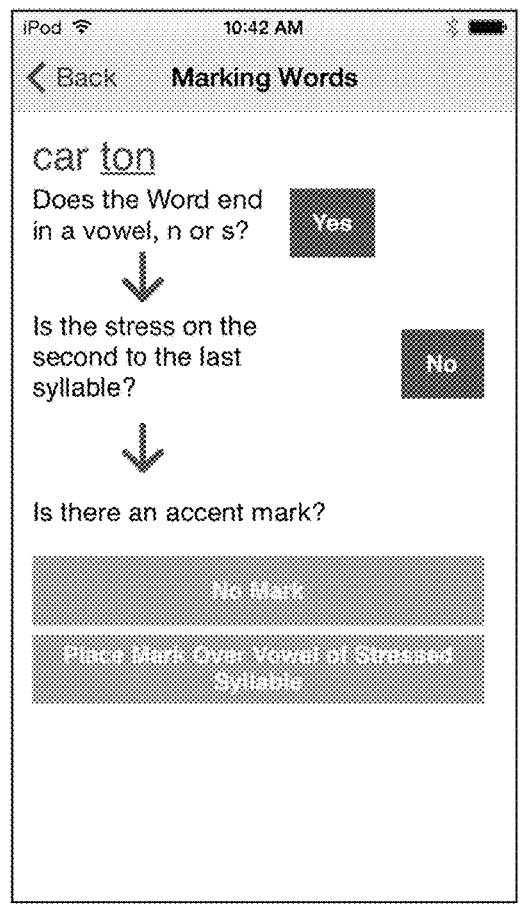
Figure 31E:
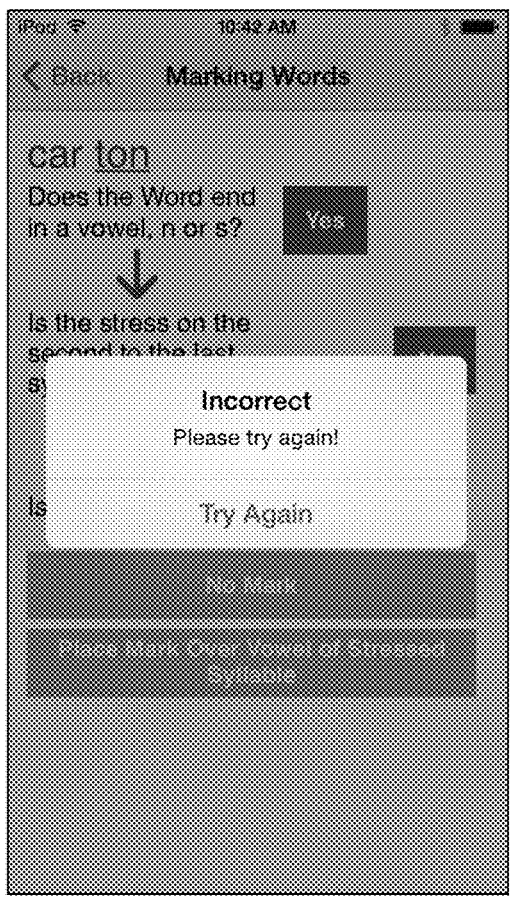
Figure 31F:
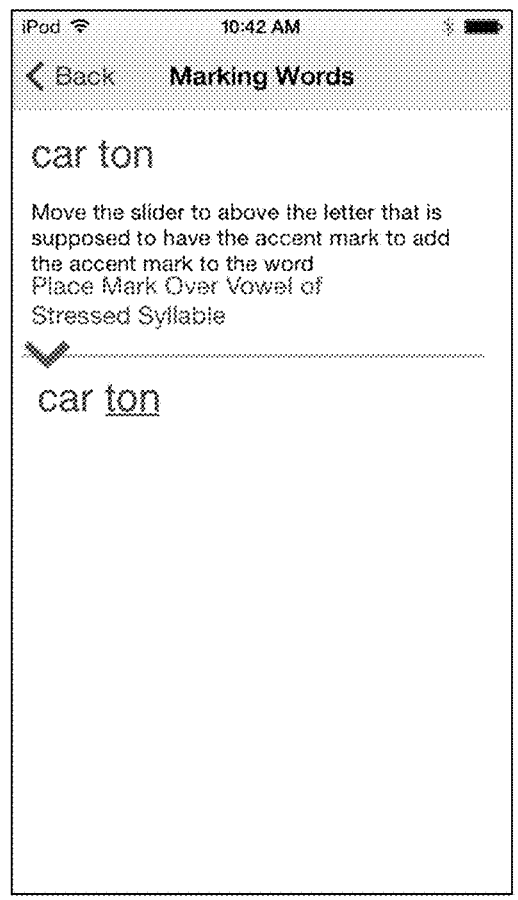
Figure 31G:
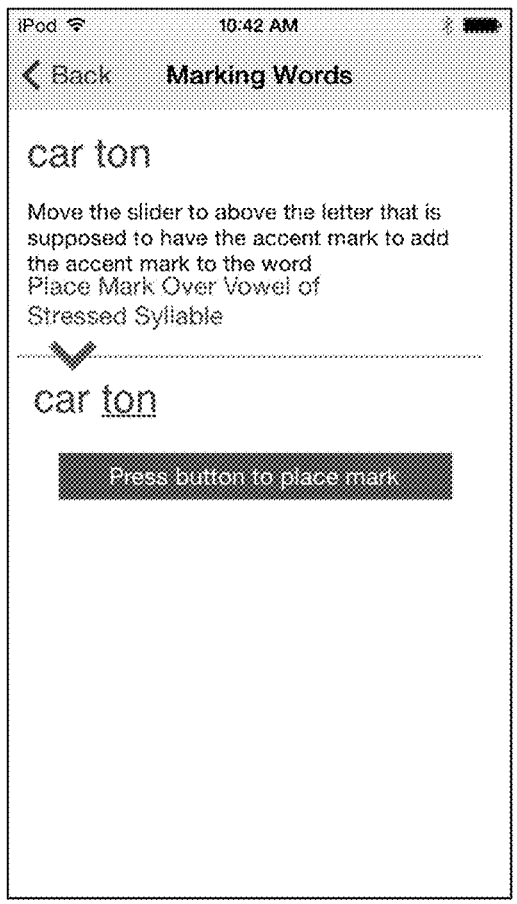
Figure 31H:
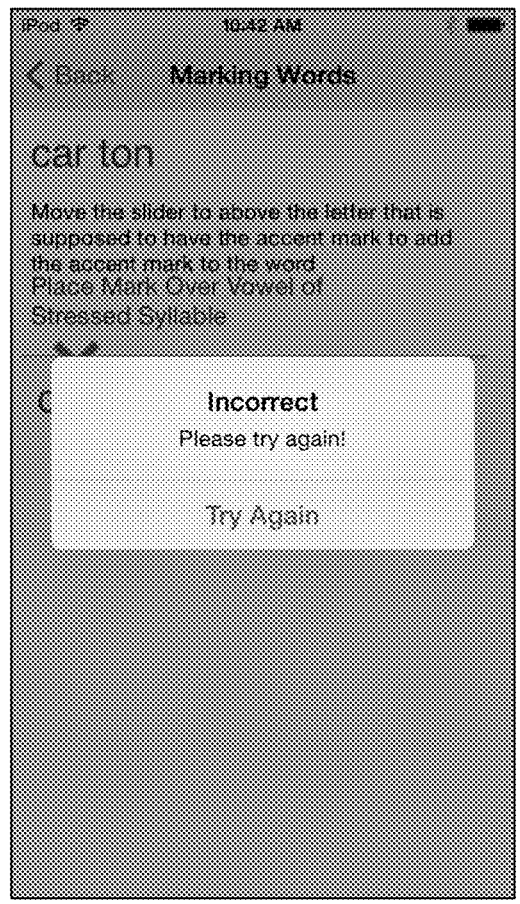
Figure 31I:
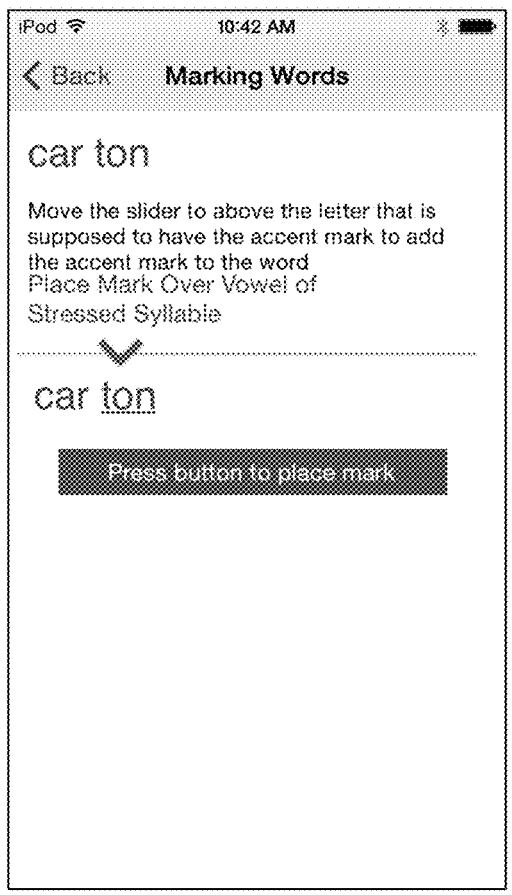
Figure 31J:
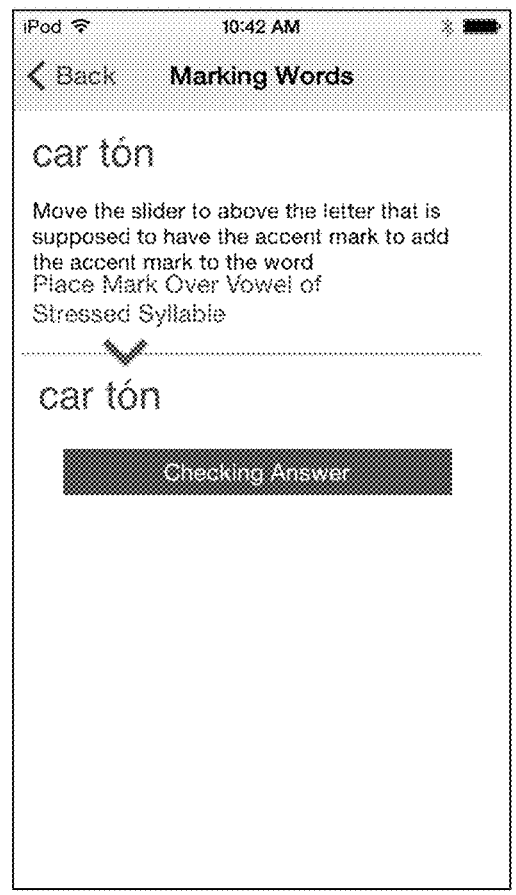
Figure 31K:
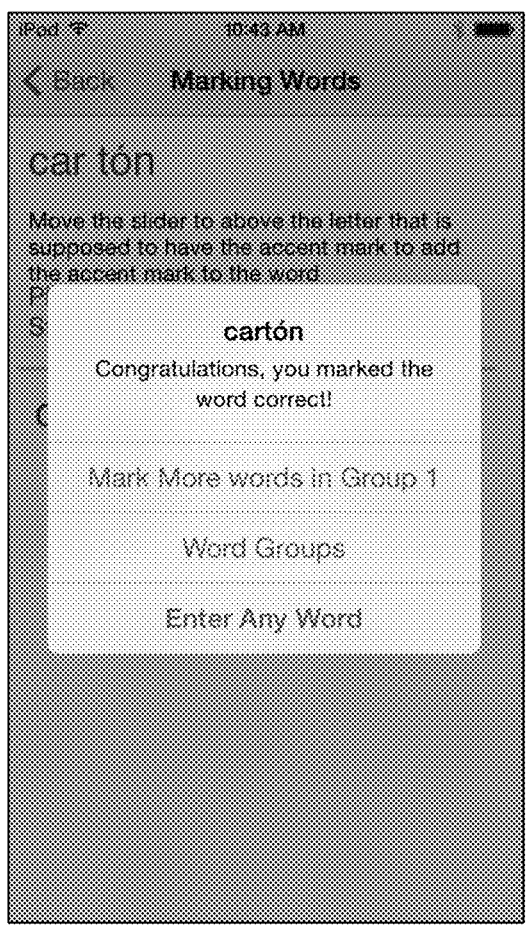

FIG. 31A depicts a user interface prompting a user to identify an ending for the example word "carton" from word set B and FIG. 31B depicts a user interface informing the user he/she provided an incorrect answer ("no" from FIG. 31A). FIG. 31C depicts a user interface prompting a user to identify whether the stress for the example word "carton" is on the second to last syllable, and includes previous correct answers that have been provided by the user for the word at issue ("carton"). FIG. 31D depicts a user interface prompting the user to identify whether or not an accent mark should be placed over the vowel of the stressed syllable, and includes previous correct answers for the ending of the word and stress for the word at issue. FIG. 31E depicts a user interface with a message indicating that the user incorrectly identified that there should not be an accent mark for "carton." FIGS. 31F-K depict user interface with a slider user interface feature through which a user can slide an icon over the syllables of the word "carton" to identify where the accent mark should be placed. FIG. 31F shows the slider in an initial starting position (not identifying a syllable to be accented), FIG. 31G depicts the slider being positioned to designate the first syllable "car" to receive an accent, FIG. 31H depicts a message indicating that the placement of the accent mark from FIG. 31G was incorrect, FIG. 31I shows the slider being positioned to designate the second syllable "ton" to receive the accent, and FIG. 31J shows the accent being placed over the second syllable. FIG. 31K depicts a user interface with a message indicating that the user correctly placed the accent mark over the second syllable.

FIGS. 32A-K are screenshots of user interfaces that can be presented for processing an example word from word set D. These example user interfaces can be output by any of a variety of appropriate computing devices (e.g., laptop, desktop computer, mobile computing devices) as part of a computer application (e.g., mobile app) that is running on the computing devices and processing a word from word set D (depicted example word "lider") using a process for word set D, such as those depicted in FIGS. 2 and 27.

Figure 32A:
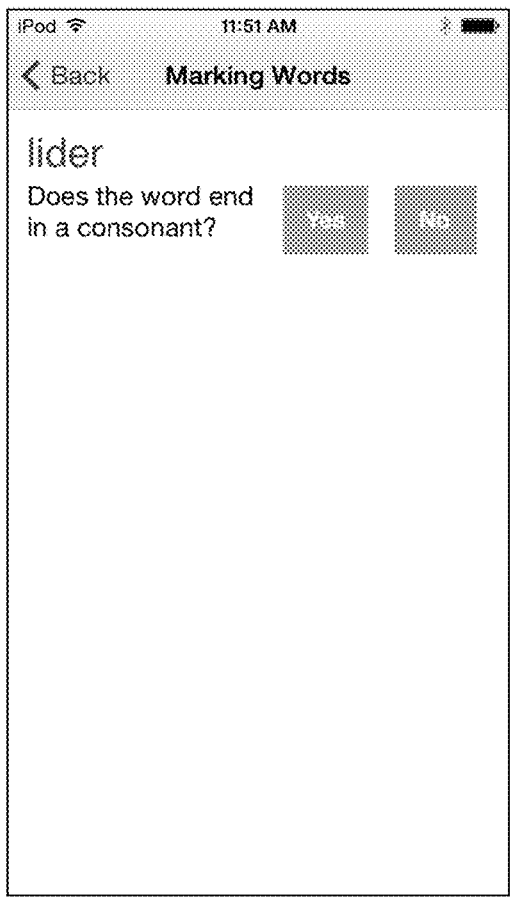
FIGS. 32A-K are screenshots of user interfaces that can be presented for processing an example word from word set D.
Figure 32B:
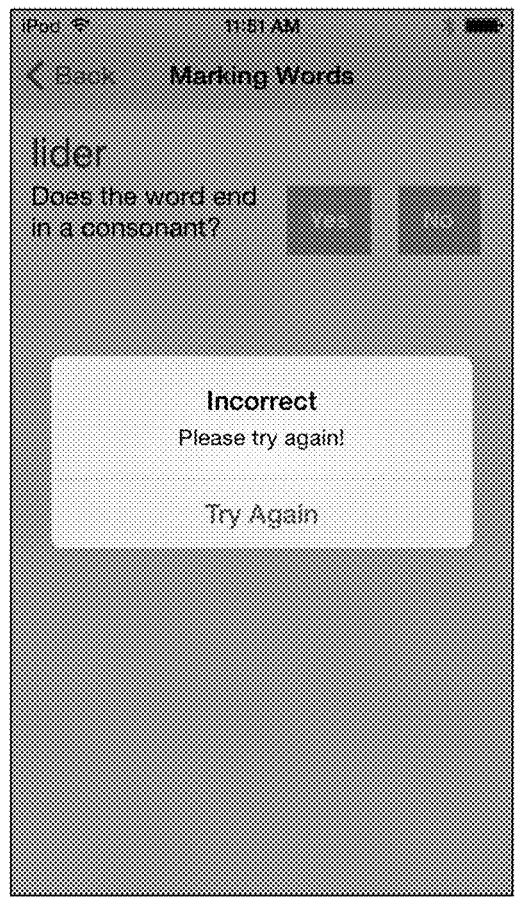
Figure 32C:
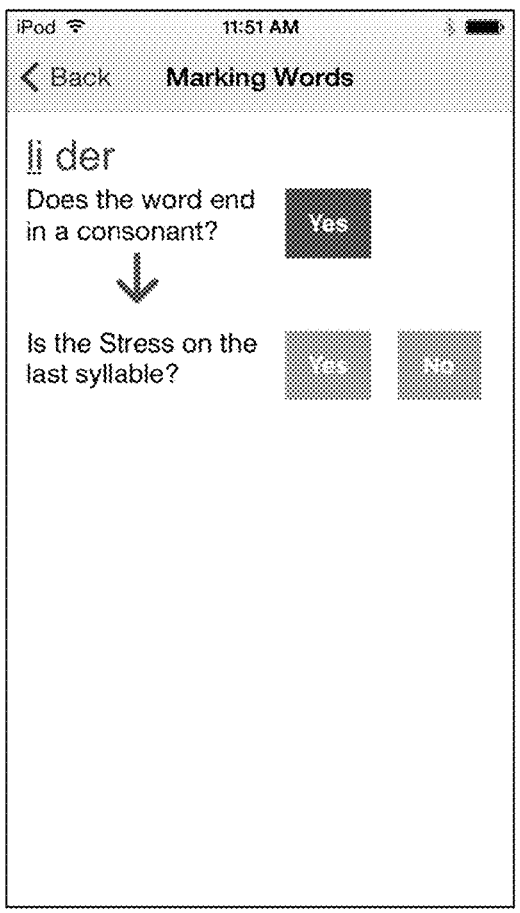
Figure 32D:
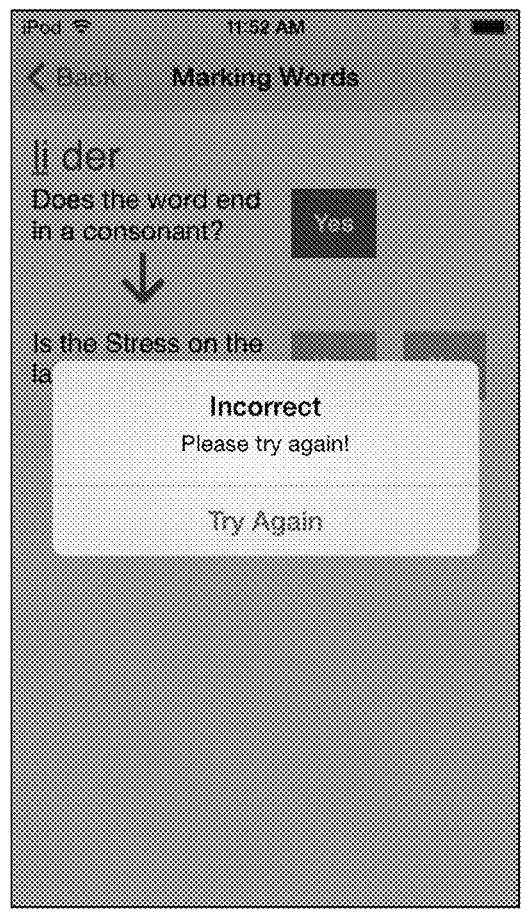
Figure 32E:
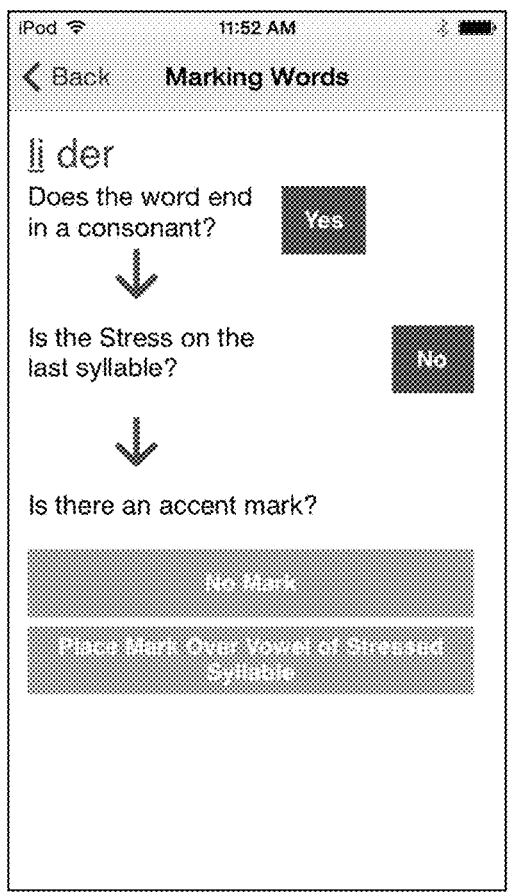
Figure 32F:
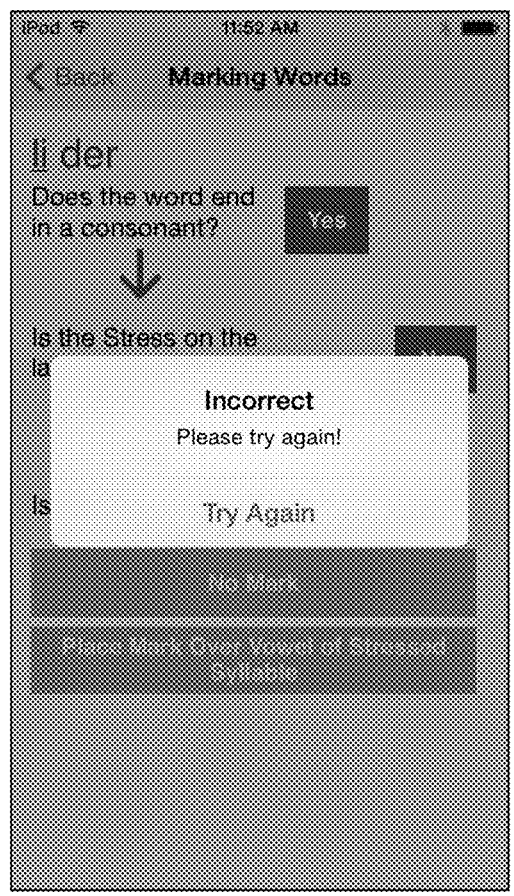
Figure 32G:
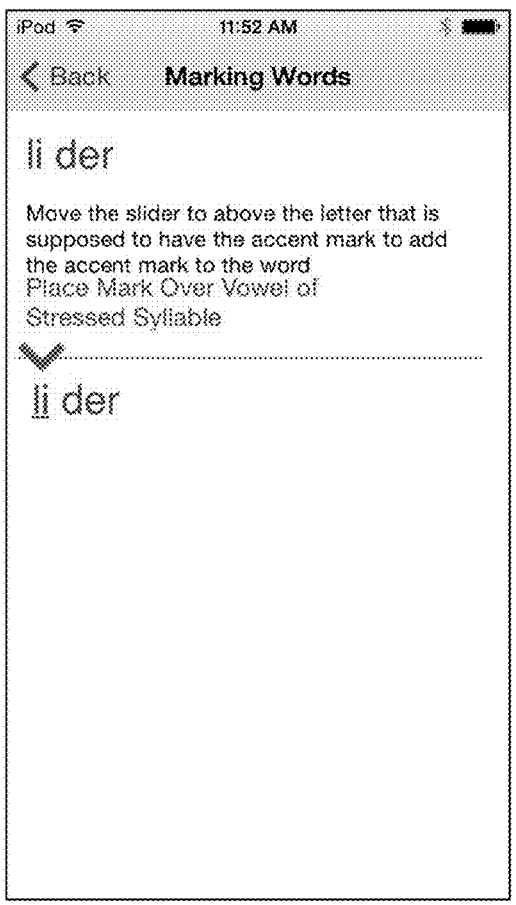
Figure 32H:
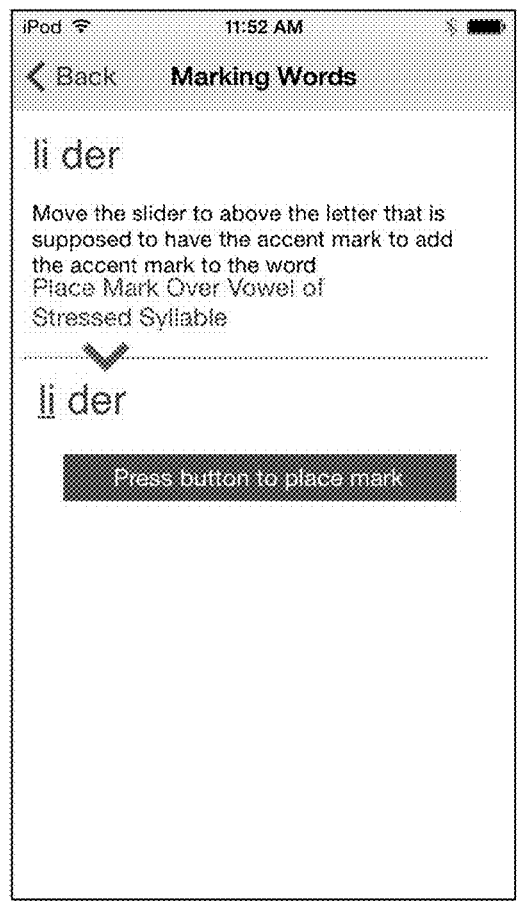
Figure 32I:
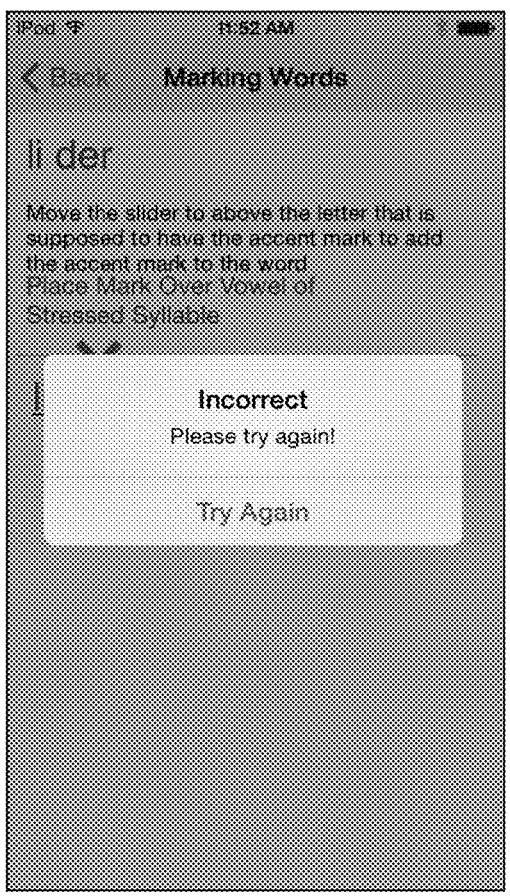
Figure 32J:
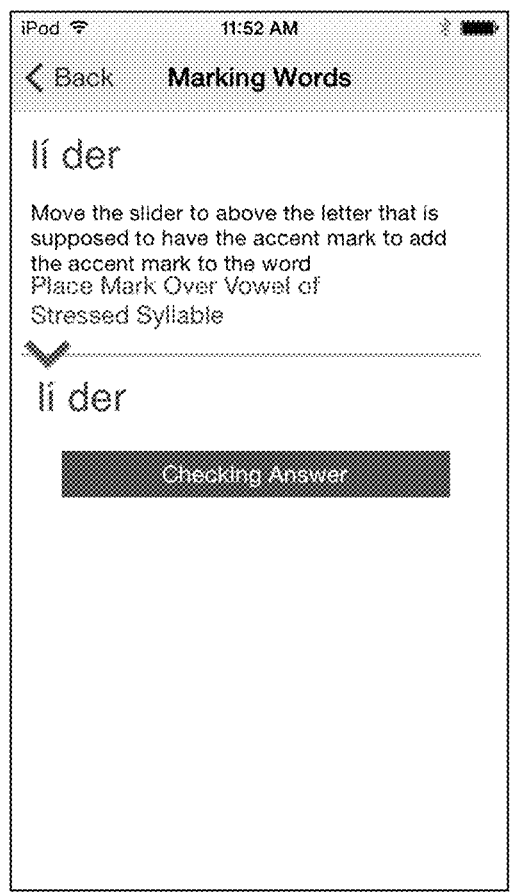
Figure 32K:
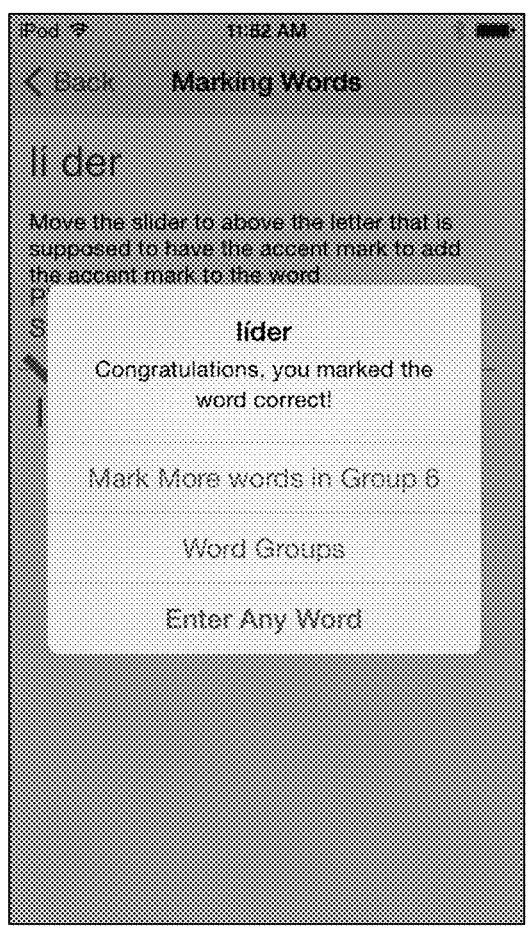

FIG. 32A depicts a user interface prompting a user to identify an ending for the example word "lider" from word set D and FIG. 32B depicts a user interface informing the user he/she provided an incorrect answer ("no" from FIG. 32A). FIG. 32C depicts a user interface prompting a user to identify whether the stress for the example word "lider" is on the last syllable, and includes previous correct answers that have been provided by the user for the word at issue ("lider"). FIG. 32D depicts a user interface notifying the user that he/she incorrectly identified that the stress is on the last syllable ("yes" from FIG. 32C). FIG. 32E depicts a user interface prompting the user to identify whether or not an accent mark should be placed over the vowel of the stressed syllable, and includes previous correct answers for the ending of the word and stress for the word at issue. FIG. 32F depicts a user interface with a message indicating that the user incorrectly identified that there should not be an accent mark for "lider." FIGS. 32G-J depict user interface with a slider user interface feature through which a user can slide an icon over the syllables of the word "lider" to identify where the accent mark should be placed. FIG. 32G shows the slider in an initial starting position (not identifying a syllable to be accented), FIG. 32H depicts the slider being positioned to designate the second syllable "der" to receive an accent, FIG. 32I depicts a message indicating that the placement of the accent mark from FIG. 32H was incorrect, FIG. 32J shows the slider being positioned to designate the first syllable "li" to receive the accent and shows the accent being placed over the first syllable. FIG. 32K depicts a user interface with a message indicating that the user correctly placed the accent mark over the first syllable.

FIGS. 33A-L are screenshots of user interfaces that can be presented for processing an example word from word set E. These example user interfaces can be output by any of a variety of appropriate computing devices (e.g., laptop, desktop computer, mobile computing devices) as part of a computer application (e.g., mobile app) that is running on the computing devices and processing a word from word set E (depicted example word "vacio") using a process for word set E, such as those depicted in FIGS. 3 and 28.

Figure 33C:
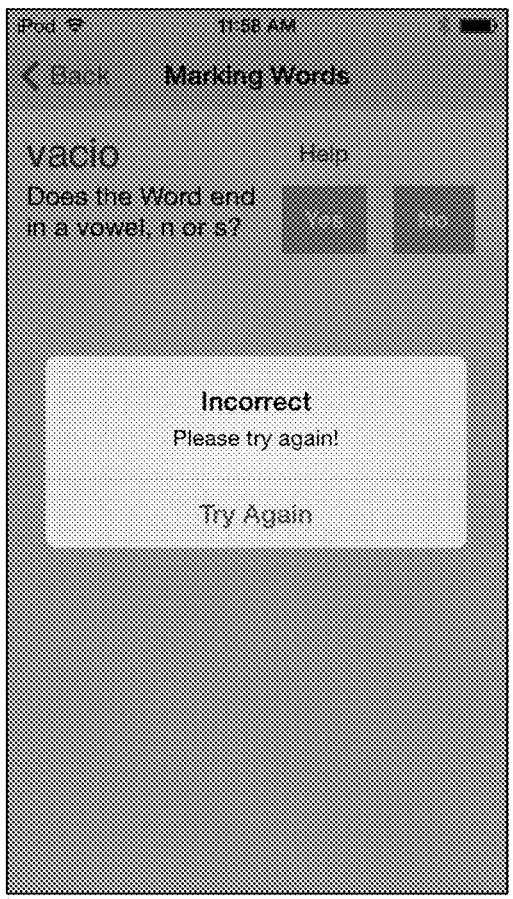
Figure 33D:
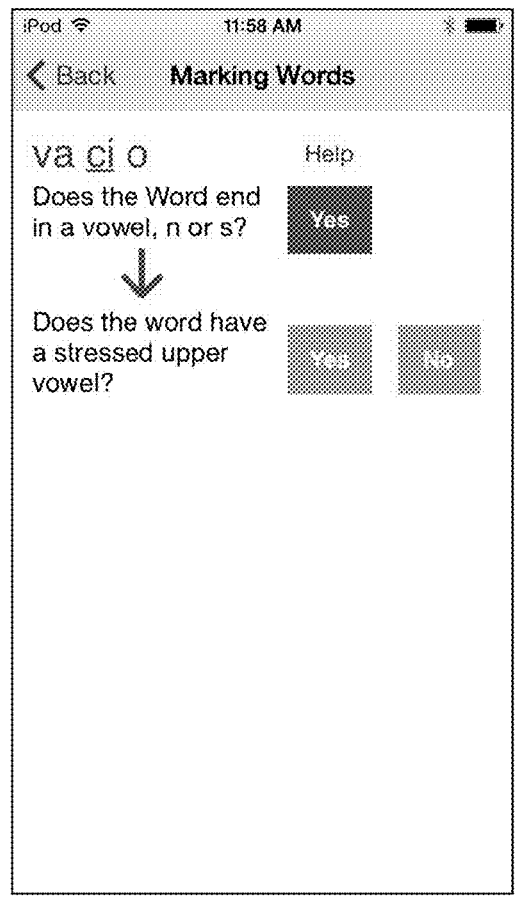
Figure 33K:
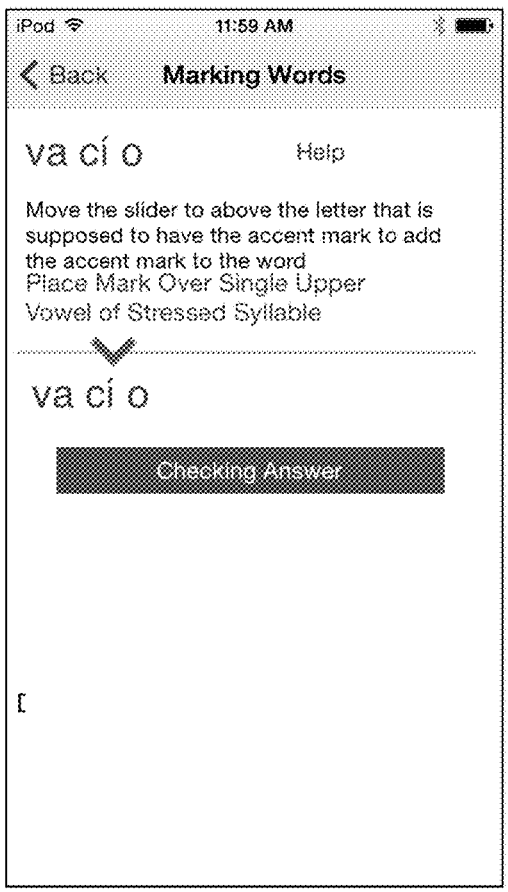
Figure 33L:
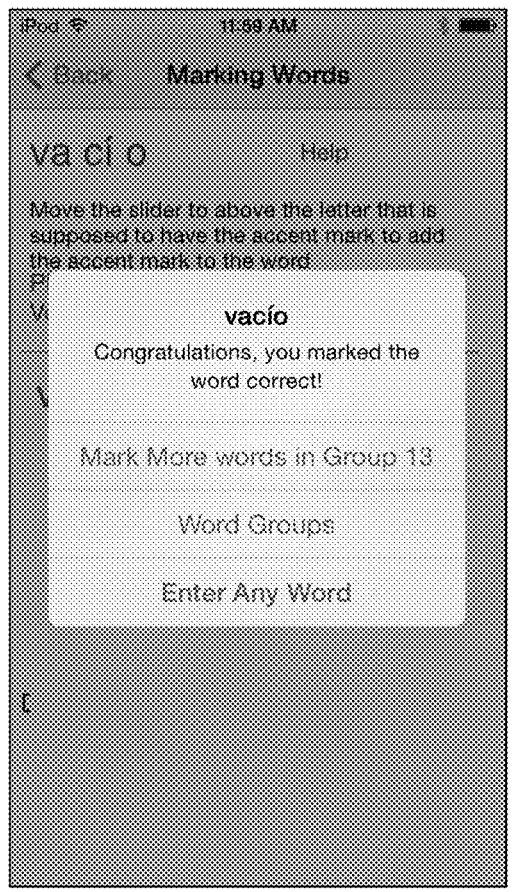

FIG. 33A depicts a user interface prompting a user to identify an ending for the example word "vacio" from word set E and FIG. 33C depicts a user interface informing the user he/she provided an incorrect answer ("no" from FIG. 32A). FIG. 33B depicts a user interface providing the user with help, such as guidance on what a hiatus is and how to identify it is present in a word. FIG. 33D depicts a user interface prompting a user to identify whether the example word "vacio" has a stressed upper vowel (upper vowel—i or u—that is stressed), and includes previous correct answers that have been provided by the user for the word at issue ("vacio"). FIG. 33E depicts a user interface notifying the user that he/she incorrectly identified that a stressed upper vowel did not exist ("no" from FIG. 33D). FIG. 33F depicts a user interface prompting the user to identify whether the word has a hiatus on either side of the stressed upper vowel. FIG. 33G depicts a user interface prompting the user to identify whether or not an accent mark should be placed over the upper vowel (i or u), and includes previous correct answers for the ending of the word and stress for the word at issue. FIGS. 33H-K depict user interface with a slider user interface feature through which a user can slide an icon over the syllables of the word "vacio" to identify where the accent mark should be placed. FIG. 33H shows the slider in an initial starting position (not identifying a syllable to be accented), FIG. 33I depicts the slider being positioned to designate the first syllable "va" to receive an accent, FIG. 33J shows the slider being positioned to designate the second syllable "ci" to receive an accent, and FIG. 33K shows the accent being placed over the second syllable (stressed upper vowel). FIG. 33L depicts a user interface with a message indicating that the user correctly placed the accent mark over the second syllable (stressed upper vowel).

FIGS. 34A-I are screenshots of user interfaces that can be presented for processing an example word from word set F. These example user interfaces can be output by any of a variety of appropriate computing devices (e.g., laptop, desktop computer, mobile computing devices) as part of a computer application (e.g., mobile app) that is running on the computing devices and processing a word from word set F (depicted example word "laud") using a process for word set F, such as those depicted in FIGS. 3 and 29.

Figure 34A:
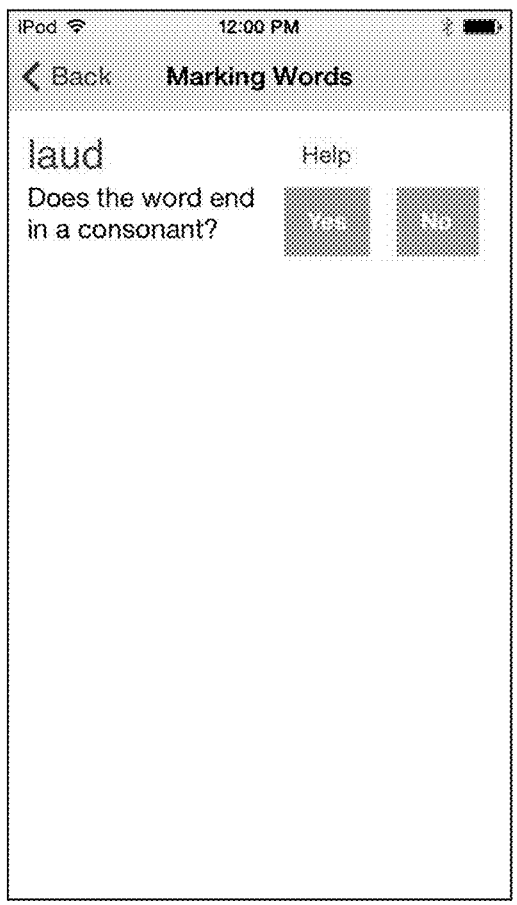
Figure 34B:
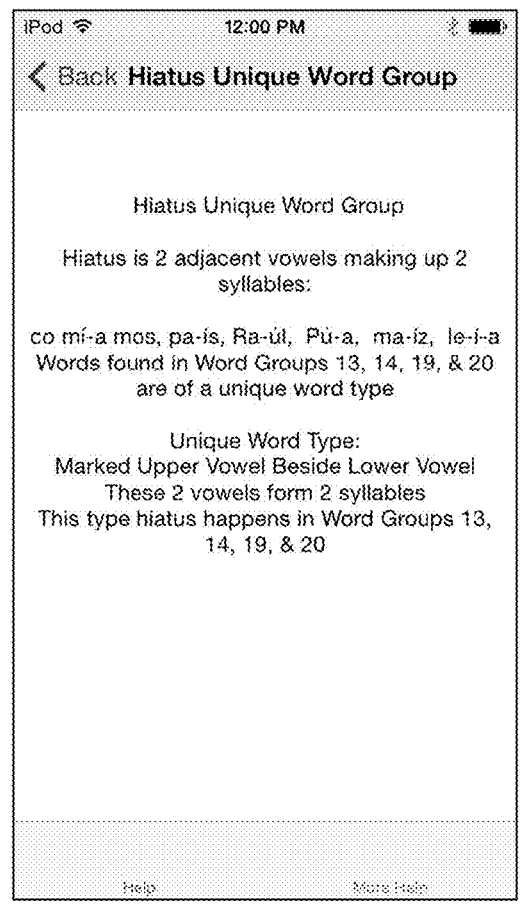
Figure 34I:
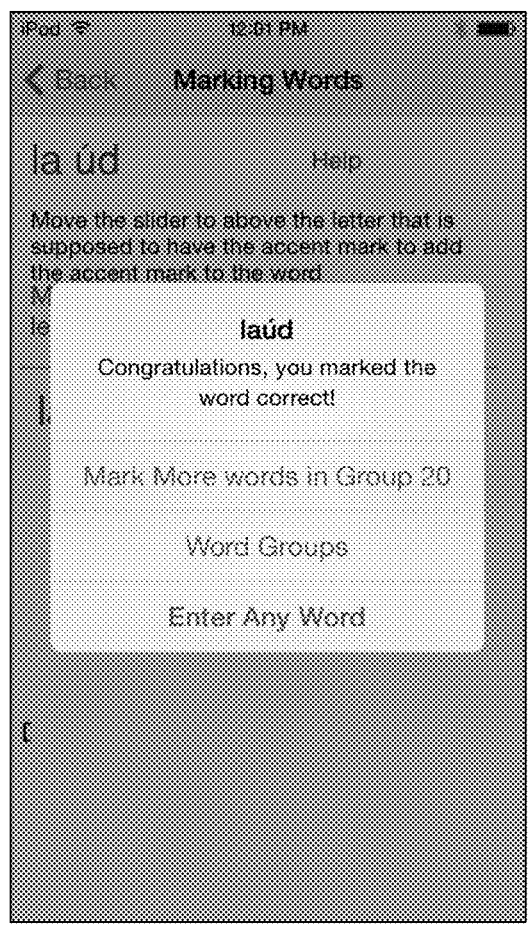

FIG. 34A depicts a user interface prompting a user to identify an ending for the example word "laud" from word set F. FIG. 34B depicts a user interface providing the user with help, such as guidance on what a hiatus is and how to identify it is present in a word. FIG. 34C depicts a user interface prompting a user to identify whether the example word "laud" has a stressed upper vowel (upper vowel—i or u—that is stressed), and includes previous correct answers that have been provided by the user for the word at issue ("laud"). FIG. 34D depicts a user interface prompting the user to identify whether the word has a hiatus on either side of the stressed upper vowel. FIG. 34E depicts a user interface prompting the user to identify whether or not an accent mark should be applied to the word, and includes previous correct answers for the ending of the word and stress for the word at issue. FIGS. 34F-H depict user interface with a slider user interface feature through which a user can slide an icon over the syllables of the word "laud" to identify where the accent mark should be placed. FIG. 34F depicts the slider being positioned to designate the first syllable "la" to receive an accent, FIG. 34G shows the slider being positioned to designate the second syllable "ud" to receive an accent, and FIG. 34H shows the accent being placed over the second syllable (stressed upper vowel). FIG. 34I depicts a user interface with a message indicating that the user correctly placed the accent mark over the second syllable (stressed upper vowel).

The user interfaces depicted in FIGS. 30-34 can be used in combination such as part of the same computer application and can be launched from a menu of options. Additionally, although not depicted, similar user interfaces can be provided to process words from word set C.

As depicted in FIGS. 35, 36 and 37A-G, word type is a manner of categorizing a word in Spanish. A word can be categorized into one word type as distinguished from a multiple of word types as a function of the interrelationship/s of alphabetical content of a word's salient syllables. A word type can be further categorized into its corresponding word set so that a word set can contain a multiple of word types.

Words that correspond to distinct word types can be processed through each word type's corresponding word set. For example, béisbol and árbol can be categorized into the same word set (Word Set D), even though these two exemplary words are categorized into distinct word types (e.g. béisbol corresponds to Word Type 12 and árbol corresponds to Word type 6), both words can be predictively processed through Word Set D. This allows user to notice the difference in salient features of the two exemplary words' salient syllables. The tonic syllable of árbol contains a single vowel, whereas the tonic syllable of béisbol contains a diphthong. Other criteria that serve as criteria for categorizing word types are the relative position of a word's salient syllables and the relative position of the alphabetic content of a word's salient syllables. A word in Spanish can be categorized into a particular word type. The combinatory potential of the content of a word type can be at least one of the following types of alphabetic content:
1) Single Vowel in the tonic syllable.
2) Diphthongs in the tonic syllable.
3) Upper vowel hiatus.
4) Leía—type words. Even though the atonic lower vowel/tonic upper vowel/atonic lower vowel appear adjacently to each other, there is hiatus because of the tonic upper vowel falling between the two outer atonic adjacent lower vowels e and a. So there is no triphthong and no diphthong.
5) Ruidoso—type words. Two adjacent upper vowels are pronounced as a diphthong in one syllable.
6) Triphthong. Phonetics. A monosyllabic speech-sound sequence perceived as being made up of three differing vowel qualities, as the pronunciation of dioico.
7) Leo—type words. Two consecutive lower vowels results in two syllables. Lower vowel hiatus.
8) A combination of alphabetic content within a salient syllable and the interrelationship of alphabetic content among at least one of the salient syllables.

The criteria used for determining a word-set is distinct from the criteria used for determining word-types.

Figure 38:
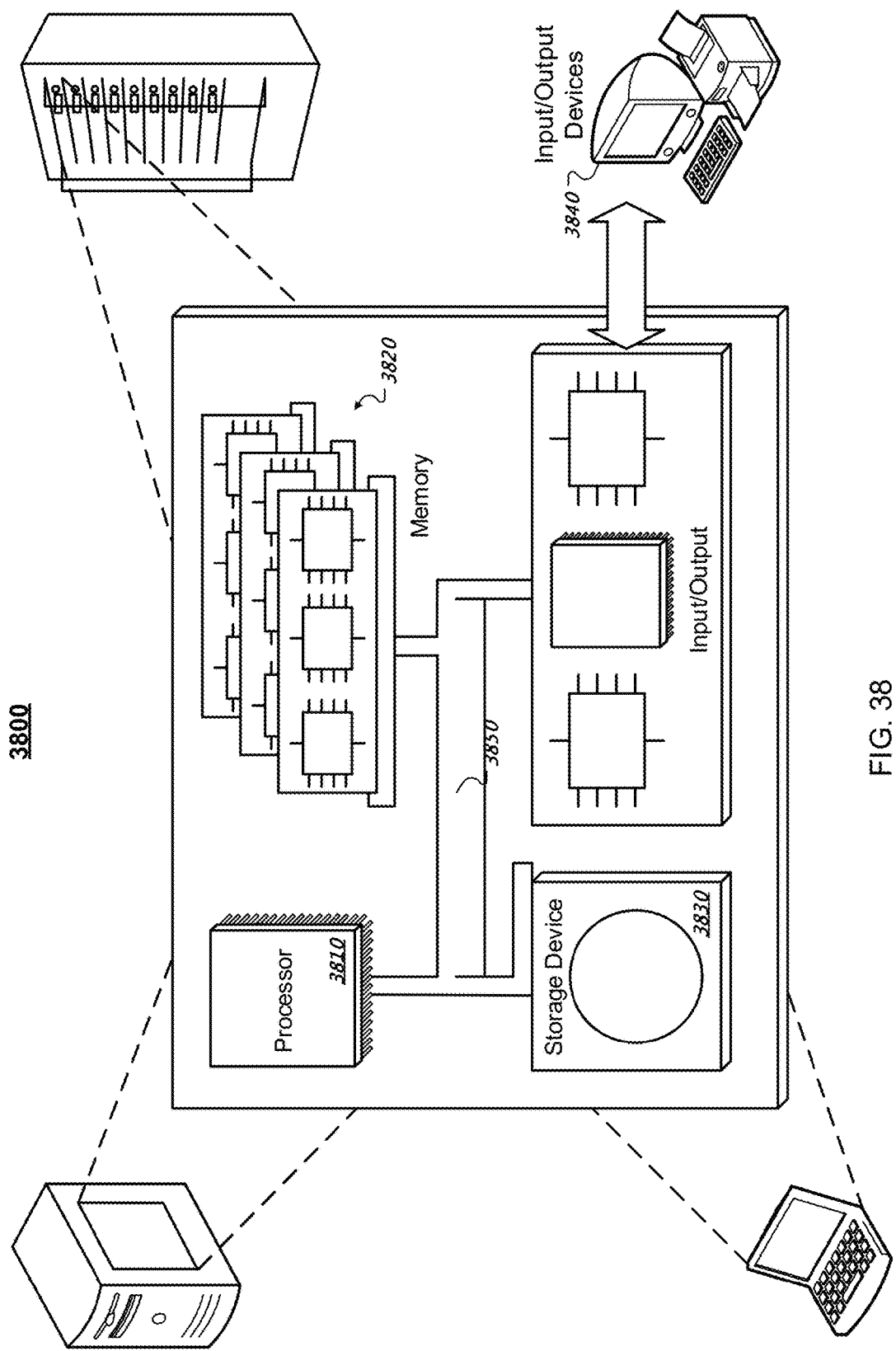
FIG. 38 illustrates a schematic diagram of an exemplary generic computer system.

FIG. 38 illustrates a schematic diagram of an exemplary generic computer system. The system 3800 can be used for the operations described in association with the processes 300 according to some implementations. The system 3800 may be included in the system 500.

The system 3800 includes a processor 3810, a memory 3820, a storage device 3830, and an input/output device 3840. Each of the components 3810, 3820, 3830, and 3820 are interconnected using a system bus 3850. The processor 3810 is capable of processing instructions for execution within the system 3800. In one implementation, the processor 3810 is a single-threaded processor. In another implementation, the processor 3810 is a multi-threaded processor. The processor 3810 is capable of processing instructions stored in the memory 3820 or on the storage device 3830 to display graphical information for a user interface on the input/output device 3840.

The memory 3820 stores information within the system 3800. In one implementation, the memory 3820 is a computer-readable medium. In one implementation, the memory 3820 is a volatile memory unit. In another implementation, the memory 3820 is a non-volatile memory unit.

The storage device 3830 is capable of providing mass storage for the system 3800. In one implementation, the storage device 3830 is a computer-readable medium. In various different implementations, the storage device 3830 may be a floppy disk device, a hard disk device, an optical disk device, or a tape device.

The input/output device 3840 provides input/output operations for the system 3800. In one implementation, the input/output device 3840 includes a keyboard and/or pointing device. In another implementation, the input/output device 3840 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A computer-implemented method for providing a graphical user interface (GUI) that teaches correct placement of accent marks on Spanish language words through a particular sequence of graphical elements, the method comprising:
    receiving, through a GUI presented by a mobile computing device that is a handheld device with a rectangular form factor display presented in portrait mode, a selection of a graphical word element corresponding to a word that is output on a top region of the display to test as part of a Spanish language teaching program;
    identifying, by the mobile computing device, a particular word set that corresponds to the word from among a plurality of word sets;
    outputting, in the GUI presented by the mobile computing device and based on the particular word set, a first graphical prompt element for a user to identify whether the word has a particular ending characteristic that corresponds to the particular word set after the word is output on the display such that the first graphical prompt element is visible to the user and displayed within the top region of the display in the portrait mode, in the GUI presented by the mobile computing device, vertically below the word;
    receiving, through the GUI presented by the mobile computing device, first user input comprising selection of a first graphical response element that corresponds to one of a plurality of first responses to the first prompt that are presented in the GUI;
    determining, by the mobile computing device and based on the particular word set, whether the first input correctly identifies the particular ending characteristic for the word;

outputting, in the GUI presented by the mobile computing device and based on (i) the determination of whether the first input is correct and (ii) the particular word set, a second graphical prompt element for the user to identify whether the word has a particular stressed syllable that corresponds to the particular word set after the first graphical prompt element is output on the display such that the second graphical prompt element is visible to the user and displayed within a middle region of the display in the portrait mode, in the GUI presented by the mobile computing device, vertically below the first graphical prompt element;

receiving, through the GUI presented by the mobile computing device, second user input comprising selection of a second graphical response element that corresponds to one of a plurality of second responses to the second prompt that are presented in the GUI;

determining, by the mobile computing device and based on the particular word set, whether the second input correctly identifies the particular stressed syllable for the word;

outputting, in the GUI presented by the mobile computing device and based on (i) the determination of whether the second input is correct and (ii) the particular word set, a third graphical prompt element for the user to identify whether the word has an accent mark after the second graphical prompt element is output on the display such that the third graphical prompt element is visible to the user and displayed within a bottom region of the display in the portrait mode, in the GUI presented by the mobile computing device, vertically below the second graphical prompt element;

receiving, through the GUI presented by the mobile computing device, third user input comprising selection of a third graphical response element that corresponds to one of a plurality of third responses to the third prompt that are presented in the GUI;

determining, by the mobile computing device and based on the particular word set, whether the third input correctly identifies whether the word has an accent mark; and outputting, through the GUI presented by the mobile computing device, a results graphical element with results that identify whether the user correctly identified whether the word has an accent mark through the selection of the first, second, and third graphical response elements.

2. The computer-implemented method of claim 1, wherein the second graphical prompt element is output at a first particular location in the GUI so that it is concurrently visible in the GUI with the first graphical prompt element and the first graphical response element.

3. The computer-implemented method of claim 2, wherein the third graphical prompt element is output at a second particular location in the GUI so that it is concurrently visible in the GUI with the first graphical prompt element, the first graphical response element, the second graphical prompt element, and the second graphical response element.

4. The computer-implemented method of claim 3, wherein the results graphical element is output at a third particular location in the GUI so that it is concurrently visible in the GUI with the first graphical prompt element, the first graphical response element, the second graphical prompt element, the second graphical response element, the third graphical prompt element, and the third graphical response element.

5. The computer-implemented method of claim 1, wherein, when the particular word set is a first word set:
the particular ending characteristic comprises a word ending in a vowel, the letter n, or the letter s,
the particular stressed syllable comprises a penultimate syllable, and
the word does not have an accent mark.

6. The computer-implemented method of claim 1, wherein, when the particular word set is a second word set:
the particular ending characteristic comprises a word ending in a vowel, the letter n, or the letter s,
the particular stressed syllable is not a penultimate syllable, and
the word does have an accent mark.

7. The computer-implemented method of claim 1, wherein, when the particular word set is a third word set:
the particular ending characteristic comprises a word ending in a consonant with exception of the letter n, or the letter s,
the particular stressed syllable comprises a last syllable, and
the word does not have an accent mark.

8. The computer-implemented method of claim 1, wherein, when the particular word set is a fourth word set:
the particular ending characteristic comprises a word ending in a consonant with exception of the letter n, or the letter s,
the particular stressed syllable is not a last syllable, and
the word does have an accent mark.

9. The computer-implemented method of claim 1, wherein, when the particular word set is a fifth word set:
the particular ending characteristic comprise a word ending in a vowel, the letter n, or the letter s,
the particular stressed syllable comprises a stressed upper vowel on either side of a hiatus, and
the word does have an accent mark over the stressed upper vowel.

10. The computer-implemented method of claim 1, wherein, when the particular word set is a sixth word set:
the particular ending characteristic comprise a word ending in a consonant with exception of the letter n, or the letter s,
the particular stressed syllable comprises a stressed upper vowel on either side of a hiatus, and
the word does have an accent mark over the stressed upper vowel.

11. The computer-implemented method of claim 1, wherein the second graphical prompt element is output in the GUI before the first graphical prompt element and the second user input is received before the first user input.

12. The computer-implemented method of claim 1, wherein the first graphical prompt element is output in the GUI before the second graphical prompt element and the first user input is received before the second user input.

13. A mobile computing device for providing a graphical user interface (GUI) that teaches correct placement of accent marks on Spanish language words through a particular sequence of graphical elements, the mobile computing device comprising:
one or more processors;
one or more handheld input devices and a rectangular form factor display that is programmed to present a GUI, the one or more handheld input devices and the rectangular form factor display presented in a portrait mode and comprising a touchscreen; and one or more storage devices containing instructions that, when executed, cause the one or more processors to perform operations comprising:

receiving, through the GUI, a selection of a graphical word element corresponding to a word that is output on a top region of the display of the touchscreen to test as part of a Spanish language teaching program;

identifying a particular word set that corresponds to the word from among a plurality of word sets;

outputting, in the GUI and based on the particular word set, a first graphical prompt element for a user to identify whether the word has a particular ending characteristic that corresponds to the particular word set after the word is output on the touchscreen such that the first graphical prompt element is visible to the user and displayed within the top region of the display in the portrait mode, in the GUI presented by the mobile computing device, vertically below to the word;

receiving, through the GUI, first user input comprising selection of a first graphical response element that corresponds to one of a plurality of first responses to the first prompt that are presented in the GUI;

determining, based on the particular word set, whether the first input correctly identifies the particular ending characteristic for the word;

outputting, in the GUI and based on (i) the determination of whether the first input is correct and (ii) the particular word set, a second graphical prompt element for the user to identify whether the word has a particular stressed syllable that corresponds to the particular word set after the first graphical prompt element is output on the touchscreen such that the second graphical prompt element is visible to the user and displayed within a middle region of the display in the portrait mode, in the GUI presented by the mobile computing device, below to the first graphical prompt element;

receiving, through the GUI, second user input comprising selection of a second graphical response element that corresponds to one of a plurality of second responses to the second prompt that are presented in the GUI;

determining, based on the particular word set, whether the second input correctly identifies the particular stressed syllable for the word;

outputting, in the GUI and based on (i) the determination of whether the second input is correct and (ii) the particular word set, a third graphical prompt element for the user to identify whether the word has an accent mark after the second graphical prompt element is output on the touchscreen such that the third graphical prompt element is visible to the user and displayed within a bottom region of the display in the portrait mode, in the GUI presented by the mobile computing device, vertically below to the second graphical prompt element;

receiving, through the GUI, third user input comprising selection of a third graphical response element that corresponds to one of a plurality of third responses to the third prompt that are presented in the GUI;

determining, based on the particular word set, whether the third input correctly identifies whether the word has an accent mark; and outputting, through the GUI, a results graphical element with results that identify whether the user correctly identified whether the word has the accent mark through the selection of the first, second, and third graphical response elements.

14. A computer-implemented method for providing a graphical user interface (GUI) that teaches correct placement of accent marks on Spanish language words through a particular sequence of graphical elements, the method comprising:

receiving, through a GUI presented by a mobile computing device that is handheld with a rectangular form factor display presented in portrait mode, a selection of a graphical word element corresponding to a word that is output on a top region of the display to test as part of a Spanish language teaching program;

identifying, by the mobile computing device, a particular word set that corresponds to the word from among a plurality of word sets;

outputting, in the GUI presented by the mobile computing device based on the particular word set, a first graphical prompt element for a user to identify whether the word has a particular ending characteristic that corresponds to the particular word set after the word is output on the display such that the first graphical prompt element is visible to the user and displayed within the top region of the display in the portrait mode, in the GUI presented by the mobile computing device, vertically below to the word;

receiving, through the GUI presented by the mobile computing device, first user input comprising selection of a first graphical response element that corresponds to one of a plurality of first responses to the first prompt that are presented in the GUI;

determining, by the mobile computing device and based on the particular word set, whether the first input correctly identifies the particular ending characteristic for the word;

outputting, in the GUI presented by the mobile computing device and based on the particular word set, a second graphical prompt element for the user to identify whether the word has a particular stressed syllable that corresponds to the particular word set after the first graphical prompt element is output on the display such that the second graphical prompt element is visible to the user and displayed within a middle region of the display in the portrait mode, in the GUI presented by the mobile computing device, vertically below to the first graphical prompt element;

receiving, through the GUI presented by the mobile computing device, second user input comprising selection of a second graphical response element that corresponds to one of a plurality of second responses to the second prompt that are presented in the GUI;

determining, by the mobile computing device and based on the particular word set, whether the second input correctly identifies the particular stressed syllable for the word;

outputting, in the GUI presented by the mobile computing device and based on the particular word set, a third graphical prompt element for the user to identify whether the word has an accent mark after the second graphical prompt element is output on the display such that the third graphical prompt element is visible to the user and displayed within a bottom region of the display in the portrait mode, in the GUI presented by the mobile computing device, vertically below to the second graphical prompt element;

receiving, through the GUI presented by the mobile computing device, third user input comprising selection of a third graphical response element that corresponds to one of a plurality of third responses to the third prompt that are presented in the GUI;

determining, by the mobile computing device and based on the particular word set, whether the third input correctly identifies whether the word has an accent mark; and outputting, through the GUI presented by the mobile computing device, a results graphical element with results that identify whether the user correctly identified whether the word has an accent mark through the selection of the first, second, and third graphical response elements.

15. The computer-implemented method of claim 14, wherein:
the first graphical prompt element is output before the second graphical prompt element, and
the second graphical prompt element is output before the third graphical prompt element.

16. The computer-implemented method of claim 14, wherein:
the first graphical prompt element is output before the third graphical prompt element, and
the third graphical prompt element is output before the second graphical prompt element.

17. The computer-implemented method of claim 14, wherein:
the second graphical prompt element is output before the first graphical prompt element, and
the first graphical prompt element is output before the third graphical prompt element.

18. The computer-implemented method of claim 14, wherein:
the second graphical prompt element is output before the third graphical prompt element, and
the third graphical prompt element is output before the first graphical prompt element.

19. The computer-implemented method of claim 14, wherein:
the third graphical prompt element is output before the first graphical prompt element, and
the first graphical prompt element is output before the second graphical prompt element.

20. The computer-implemented method of claim 14, wherein:
the third graphical prompt element is output before the second graphical prompt element, and
the second graphical prompt element is output before the first graphical prompt element.

* * * * *